(12) United States Patent
Drummond et al.

(10) Patent No.: US 10,184,505 B2
(45) Date of Patent: Jan. 22, 2019

(54) COMPRESSIVE INDENTATION FASTENER DEVICE

(71) Applicant: SR Systems, LLC, Tuscaloosa, AL (US)

(72) Inventors: Scott Drummond, Tuscaloosa, AL (US); Steve Zimmerman, Linden, AL (US); Van T. Walworth, Lebanon, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 485 days.

(21) Appl. No.: 14/735,920

(22) Filed: Jun. 10, 2015

(65) Prior Publication Data

US 2015/0354613 A1 Dec. 10, 2015

Related U.S. Application Data

(60) Provisional application No. 62/010,163, filed on Jun. 10, 2014, provisional application No. 62/108,259, filed on Jan. 27, 2015.

(51) Int. Cl.
*F16B 15/02* (2006.01)
*F16B 5/06* (2006.01)
(Continued)

(52) U.S. Cl.
CPC .............. *F16B 15/02* (2013.01); *B21K 1/46* (2013.01); *B21K 1/466* (2013.01); *F16B 5/0642* (2013.01);
(Continued)

(58) Field of Classification Search
CPC ....................................................... F16B 15/02
(Continued)

(56) References Cited

U.S. PATENT DOCUMENTS 112,335 A * 3/1871 Linsey
387,380 A 8/1888 Thayer
(Continued)

FOREIGN PATENT DOCUMENTS

CN 2508041 Y 8/2002
DE 19506081 A1 8/1996
(Continued)

OTHER PUBLICATIONS

International Search Report and Written Opinion of the International Searching Authority for PCT/US2016/044962, dated Nov. 8, 2016.
(Continued)

*Primary Examiner* — Gary W Estremsky
(74) *Attorney, Agent, or Firm* — Harness, Dickey & Pierce, P.L.C.

(57) ABSTRACT

A compression indentation fastener device is described comprising a shank and a head. The head extends outwardly from an end of the shank in a transverse plane to define a head periphery. The head has an anterior side and a posterior side. The anterior side includes an exposed area extending between the shank and the head periphery. The anterior side includes a relief portion in the form of a depression. The relief portion is open at the anterior side of the head such that the relief portion receives a volume of substrate material when the exposed area of the head impacts the substrate material. The head may be integral with the shank or the head may be comprised of discrete head portions that mate with one another. Additionally, the head may be centered on the end of the shank or offset relative to the shank.

13 Claims, 18 Drawing Sheets

(51) Int. Cl.
- *F16B 15/06* (2006.01)
- *B21K 1/46* (2006.01)
- *F16B 35/06* (2006.01)
- *F16B 43/02* (2006.01)

(52) U.S. Cl.
CPC .............. *F16B 15/06* (2013.01); *F16B 35/06* (2013.01); *F16B 43/02* (2013.01)

(58) Field of Classification Search
USPC ......................................... 411/473, 481, 484
See application file for complete search history.

(56) References Cited

U.S. PATENT DOCUMENTS

| | | | |
|---|---|---|---|
| 954,924 A * | 4/1910 | Brooks | 411/373 |
| 1,320,901 A * | 11/1919 | Nestor | F16B 15/02 411/484 |
| 1,395,960 A * | 11/1921 | Hill | F16B 15/02 411/484 |
| 1,407,641 A * | 2/1922 | Cross | F16B 15/02 411/371.1 |
| 1,494,028 A * | 5/1924 | Schulte | |
| 1,620,193 A * | 3/1927 | Coates | F16B 15/02 411/377 |
| 1,820,556 A * | 8/1931 | Campbell | F16B 35/048 411/399 |
| 1,995,705 A * | 3/1935 | Deniston, Jr. | E04D 3/3606 411/371.1 |
| 2,032,099 A * | 2/1936 | Rosenberg | B21G 5/00 411/439 |
| 2,048,093 A * | 7/1936 | Alpeters | E04D 5/145 411/473 |
| 2,086,086 A * | 7/1937 | Lassonde | F16B 15/02 411/371.1 |
| 2,093,610 A | 9/1937 | Kraemer | |
| 2,099,990 A * | 11/1937 | Rosenberg | F16B 15/02 411/377 |
| 2,140,749 A * | 12/1938 | Kaplan | F16B 15/0092 411/377 |
| 2,207,897 A * | 7/1940 | Schaus | E04D 5/142 411/456 |
| 2,226,006 A * | 12/1940 | Maze | F16B 15/02 411/453 |
| 2,256,401 A | 9/1941 | Maze | |
| 2,334,406 A * | 11/1943 | Gray | E04D 5/145 411/484 |
| 4,726,164 A | 2/1988 | Reinwall et al. | |
| 4,860,513 A | 8/1989 | Whitman | |
| 4,884,932 A | 12/1989 | Meyer | |
| 4,932,820 A | 6/1990 | Schniedermeier | |
| 5,031,262 A * | 7/1991 | Baritz | B21G 5/00 29/505 |
| 5,039,262 A | 8/1991 | Giannuzzi | |
| 5,069,589 A | 12/1991 | Lemke | |
| 5,154,670 A | 10/1992 | Sygnator et al. | |
| 5,407,313 A | 4/1995 | Bruins et al. | |
| 5,516,248 A | 5/1996 | DeHaitre | |
| 5,622,464 A * | 4/1997 | Dill | |
| 6,758,018 B2 | 7/2004 | Sutt, Jr. | |
| 7,374,384 B2 | 5/2008 | Sutt, Jr. | |
| 7,395,925 B2 | 7/2008 | Sutt, Jr. | |
| 7,818,940 B2 | 10/2010 | Herb | |
| 7,850,410 B1 | 12/2010 | Curtis | |
| 8,375,549 B2 * | 2/2013 | Draht | F16B 19/14 29/432 |
| 8,529,180 B1 | 9/2013 | Sargis | |
| 8,726,581 B2 | 5/2014 | Zimmerman et al. | |
| 8,794,893 B2 | 8/2014 | Aihara et al. | |
| 8,998,056 B2 | 4/2015 | Huang et al. | |
| 9,163,654 B2 | 10/2015 | Barenski, Jr. et al. | |
| 2003/0175093 A1 | 9/2003 | Walther | |
| 2004/0228705 A1 | 11/2004 | Baer et al. | |
| 2007/0204552 A1 * | 9/2007 | Onofrio | F16B 5/0275 52/698 |
| 2007/0224020 A1 | 9/2007 | Hsieh et al. | |
| 2010/0172719 A1 | 7/2010 | Maltais et al. | |
| 2010/0183403 A1 | 7/2010 | Ali et al. | |
| 2010/0196122 A1 | 8/2010 | Craven | |
| 2010/0224038 A1 | 9/2010 | Evatt | |
| 2014/0076954 A1 | 3/2014 | Miller et al. | |

FOREIGN PATENT DOCUMENTS

| | | |
|---|---|---|
| DE | 19508454 A1 | 9/1996 |
| GB | 7322030 A | 6/1955 |
| GB | 818246 | 8/1959 |
| GB | 947816 A | 1/1964 |
| GB | 1046456 A | 10/1966 |
| JP | 2001280318 A | 10/2001 |
| JP | 2001280324 A | 10/2001 |
| JP | 2004316761 A | 11/2004 |
| JP | 2006250231 A | 9/2006 |
| JP | 2010116949 A | 5/2010 |
| JP | 2011528772 A | 11/2011 |
| JP | D1437446 | 4/2012 |
| JP | D1473814 | 7/2013 |
| WO | WO-0106135 A2 | 1/2001 |
| WO | WO-2006039412 A2 | 4/2006 |

OTHER PUBLICATIONS

International Preliminary Report on Patentability for PCT/US2015/035188 dated Dec. 22, 2016.
International Search Report for PCT/US2015/035190, dated Sep. 23, 2015.
Written Opinion of the International Searching Authority for PCT/US20105/035190, dated Sep. 23, 2015.
U.S. Appl. No. 15/100,168, filed May 27, 2016, Scott Drummond, et al.
U.S. Appl. No. 15/223,179, filed Jul. 29, 2016, Steve Zimmerman, et al.
Notice of Third Party Submissions Under the Japanese Patent Law Enforcement Regulation 3-2 for JP 2016-572505, mailed Dec. 11, 2017.
EP Supplementary Search Report and Written Opinion for EP 15806959.1, dated Jan. 4, 2018.
EP Supplementary Search Report and Written Opinion for EP 15805869.3, dated Jan. 4, 2018.
International Search Report for PCT/US2015/035188, dated Sep. 23, 2015.
Written Opinion of the International Searching Authority for PCT/US2015/035188, dated Sep. 23, 2015.

* cited by examiner

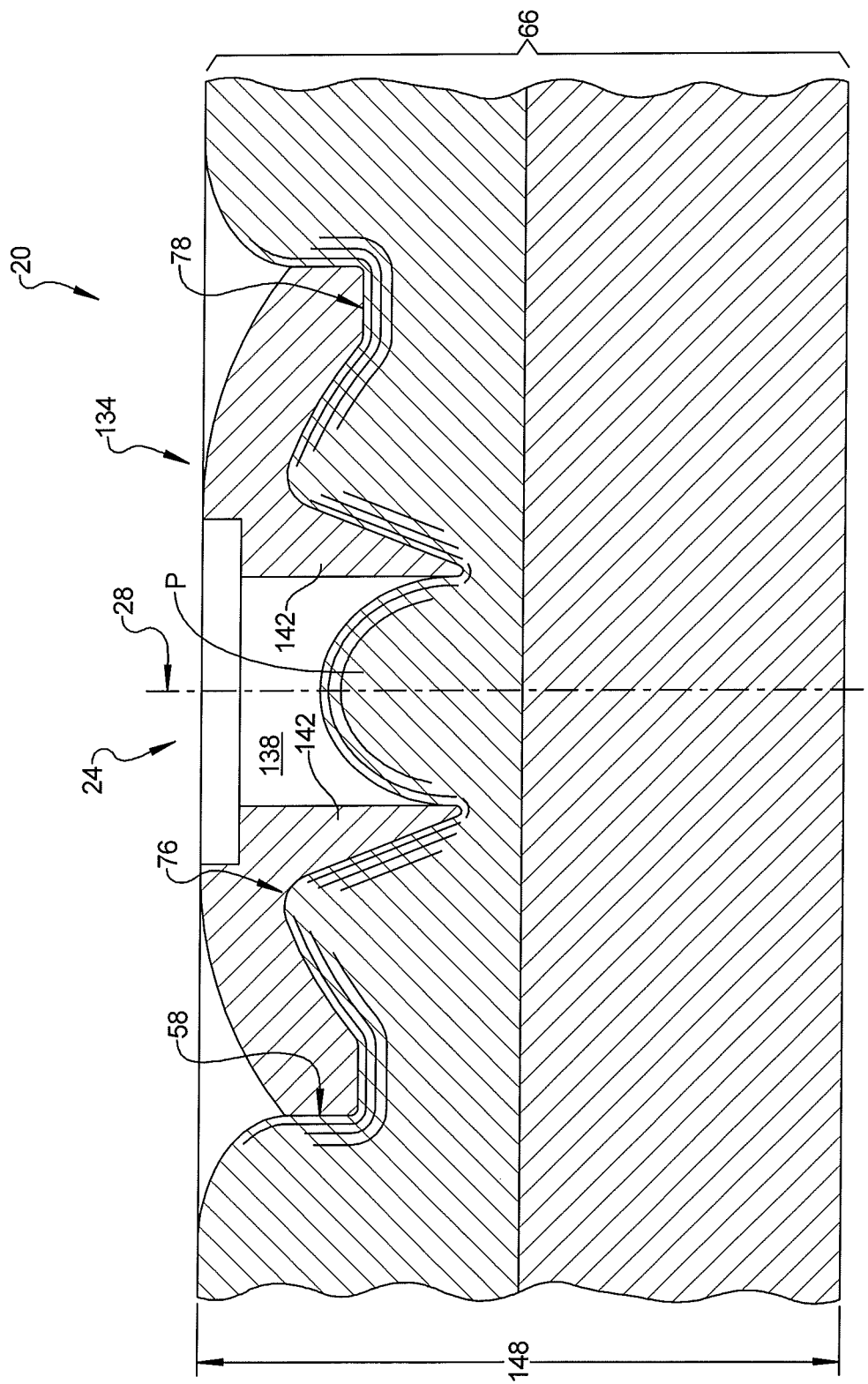

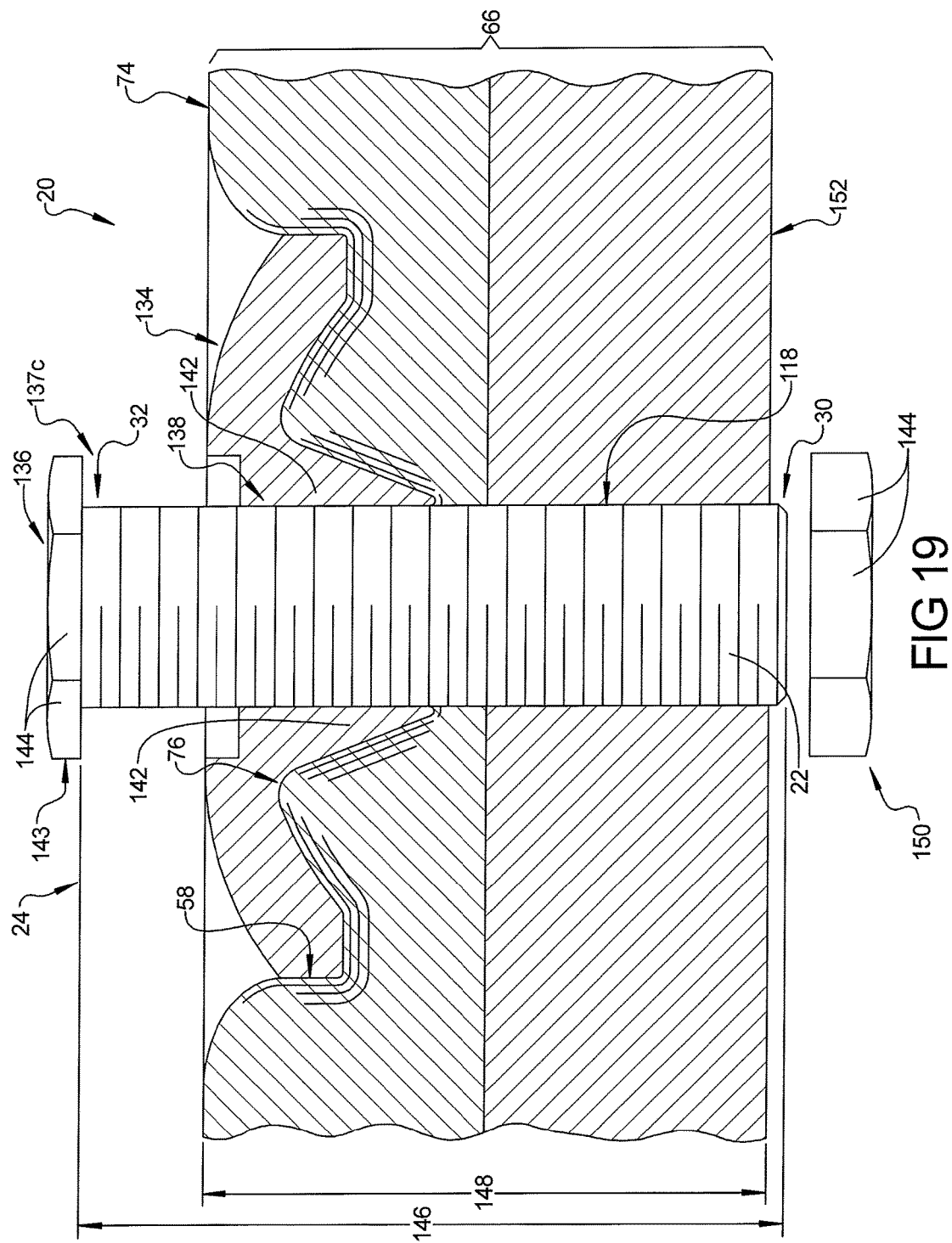

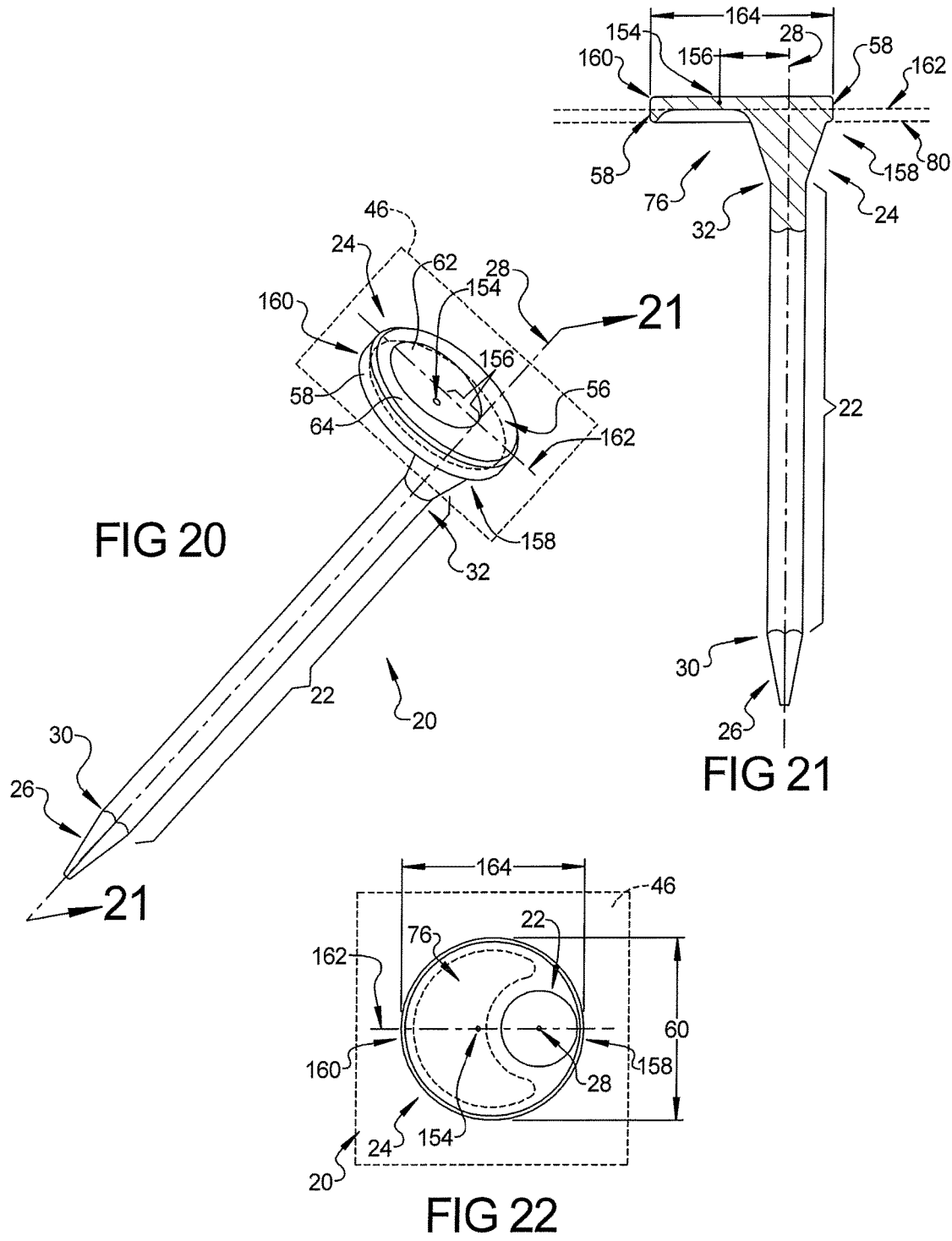

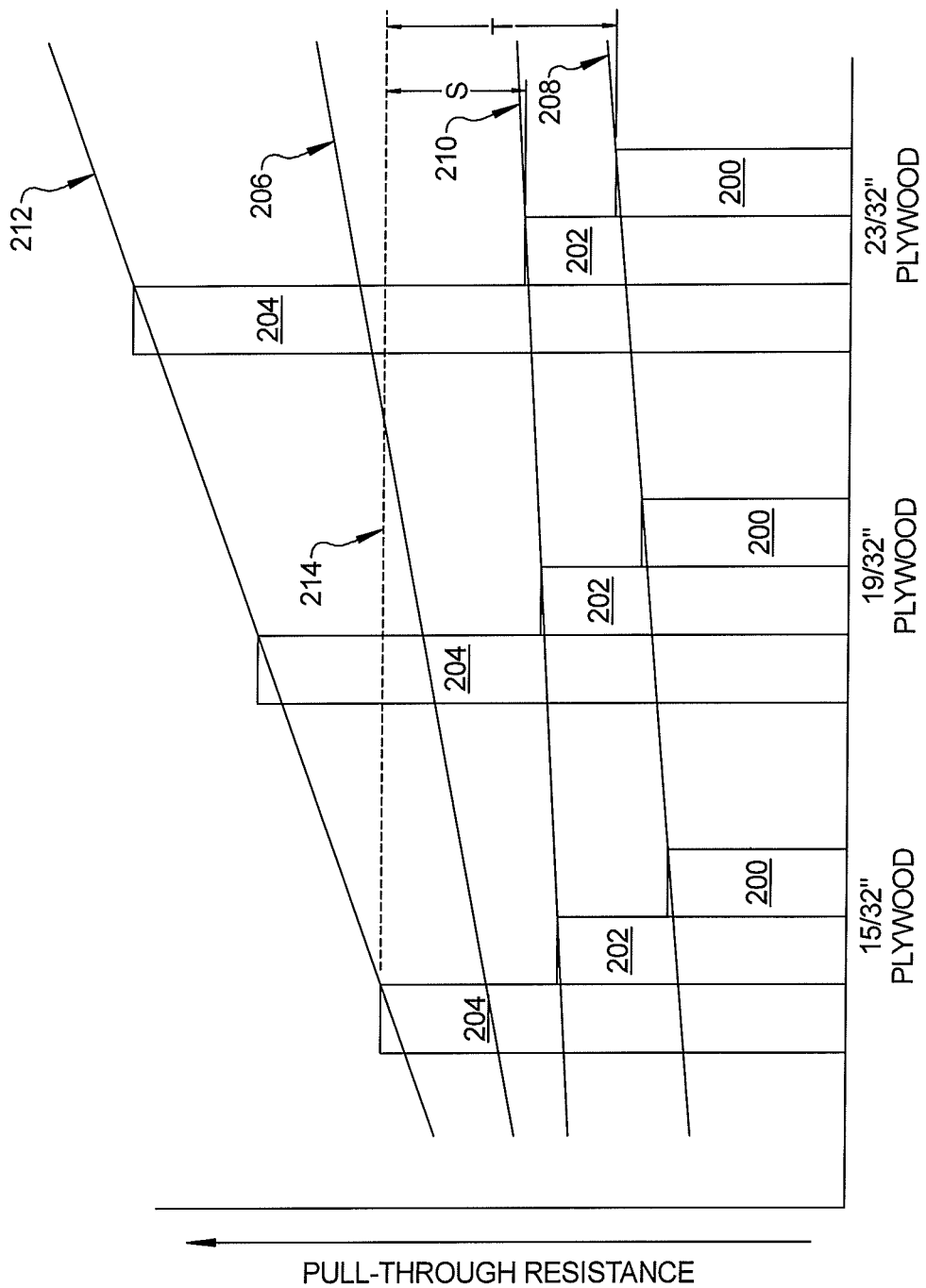

COMPRESSIVE INDENTATION FASTENER DEVICE

CROSS REFERENCE TO RELATED APPLICATIONS

This application claims the benefit of U.S. Provisional Application No. 62/010,163, filed Jun. 10, 2014 and U.S. Provisional Application No. 62/108,259, filed Jan. 27, 2015. The present application is also related to U.S. application Ser. No. 14/735,934, entitled "ENLARGED HEAD FASTENER DEVICE AND METHOD OF MANUFACTURE"), filed on the same day as this application. The entire disclosures of the above applications are incorporated herein by reference.

FIELD

The subject disclosure generally relates to fasteners. By way of example and without limitation, such fasteners may be used in the construction industry for securing multiple building components to one another.

BACKGROUND

This section provides background information related to the present disclosure and is not necessarily prior art.

Nail-like fasteners have been used for thousands of years. Some archeological evidence suggests that nail-like fasteners may have been used in Mesopotamia as long ago as 3500 B.C. Early nails were forged or shaped with hammers. Several millennia later in the 1500s A.D. machines were developed to produce a "cut-nail" fastener from a strip of iron. Not until the mid-1800s were machines and methods developed to produce nail-like fasteners made from metal wire. Most nail-like fasteners of the present day are still produced by machines, methods, and techniques that utilize a metal wire forming process.

At the beginning of the American Revolution, England held the distinction of being the world's leading producer of nails. At that time, there was essentially no nail production taking place in the American Colonies on a commercial scale. As a result many Colonial households setup a simple nail manufacturing process in their homes using home fires as a manufacturing tool. Colonist made nails for their own use as well as for bartering for other goods and services. The first wide spread manufacture of wire nails in the USA was in 1877-1879 using iron wire from Norway. Wire nails had been used in Norway for many years prior to their introduction to the USA construction market. Testing as early as the year 1884, conducted by the Watertown Arsenal, in Watertown, Mass., revealed that cut-nails had superior withdrawal resistance compared to iron wire nails. However, because the wire nails could be produced at significantly lower cost than cut-nails, the construction industry gravitated to wire nails and away from cut-nails. Now, over 130 years later, there are over 2,000 varieties of nail-like fasteners being produced in modern times.

Nail-like fasteners are used for many purposes and are designed for use in many types of materials and/or applications. One application is in the wood frame construction industry, where nail-like fasteners are utilized to fasten wood and/or wood-like materials together. In general, the construction industry has many applications for residential and/or commercial structures using structural substrate components made of wood and/or wood-like materials. The wood and/or wood-like substrate materials receive fastener devices that are applied to restrain and/or couple the wood and/or wood-like substrate materials to one another and to other construction components. Typical fasteners such as nails, screws, and bolts generally include a longitudinally extending shank and a head that extends radially outwardly from the end of the shank.

Many standard nails are loose, which facilitate being driven by hand while many other nails are collated or coiled in some fashion to facilitate use with a powered delivery system. In a similar fashion, screws are available for application by hand and/or powered delivery systems. Typically, bolted fasteners are manually installed while final torque is either applied manually or with the assistance of a powered system. There are many features applied to the shanks of nails, screws, and bolts to assist the retention and holding strength of the fastener. Some features that have been applied to the shank of nail-like fasteners include special coatings, spiral twisting, ring shanks, knurls, barbs, ribs, and splines, just to name a few. Some nail-like and/or screw-like fasteners combine multiple shank features on the same shank. In similar fashion, screw-like and bolt-like shanks feature many different kinds of thread patterns, continuous threads, discontinuous threads, single flutes, multiple flutes, special coatings, and combinations of thread patterns on the same shank, just to name a few. Even though many variations exist, the heads of most fasteners used in residential and commercial construction to connect and/or restrain wood and/or wood like materials are relatively small in size. Furthermore, the heads of most typical fasteners are designed and manufactured in such a way that they cut and/or rupture surface fibers of the substrate material.

When a typical fastener is installed in a typical wood and/or wood-like substrate material, a tug-a-war of sorts results between the substrate material and the fastener. For instance, a typical plywood roof decking substrate material of a typical wood frame construction is fastened to a wood rafter framing substrate material using a nail. In many regions near coastal areas prone to high wind storms, building codes require at least an 8 d nail applied in a prescribed pattern and spacing in order to achieve a safe working load design. The tug-a-war in this scenario plays out during a high wind storm as the roof decking substrate material is challenged to come off and separate from the wood rafter framing substrate material. Effectively, the only thing holding the roof decking substrate material together with the wood rafter substrate material are the nails. The nail shanks are challenged to not withdraw from the wood rafter substrate material while at the same time the nail head is challenged to not pull-through the roof decking substrate material.

The weakest link in the pull-through withdrawal tug-of-war will fail first such that one of three failure modes results. In the first failure mode, the nail shank will withdraw from the wood rafter substrate material so that the nail head remains embedded in the roof decking substrate material (i.e. the roof decking substrate material lifts off the wood rafter substrate material taking the nails with it.) In the second failure mode, the nail head will pull-through the roof decking substrate material and the nail shank will remain embedded in the wood rafter substrate (i.e. the roof decking substrate material lifts off the wood rafter substrate material while the nails remain in the wood rafter substrate material). A third failure mode, less common than the first and second failure modes, is fastener failure, where the nail head or the shank fails due to breakage, bending, or shearing. When any one of these three failure modes occur, the wood roof decking substrate material comes off resulting in the building suffering extensive damage and property loss.

Independent third party lab testing conducted by NTA, Inc. has demonstrated that commonly used nails lose as much as half of their initial withdrawal resistance within two days of being driven in place. Then after about a month later, the wood fibers of the substrate material will cooperate with the nail to slightly increase its withdrawal resistance, though the final withdrawal resistance will still be significantly less than the initial resistance.

Shank features such as barbs, ring shanks, spirals, and flutes have been shown to lose significant withdrawal resistance when the substrate material is subjected to environmental conditions, which causes the dry shrinking of wood substrate fibers over long periods of time. In addition, shank features such as barbs, ring shanks, spirals, and flutes have been shown to lose significant withdrawal resistance when the nail and substrate material are subjected to vibration, which may be created by storm winds beating upon a structure, seismic activity generated by tornadoes beating the ground as they travel, and seismic activity associated with earth quakes and ground shifting.

Examples of nail-like fasteners include those disclosed in U.S. Pat. No. 387,380 entitled "Flat Pointed Nail or Tack," which issued to J. F. Thayer on Aug. 7, 1888, U.S. Pat. No. 2,093,610 entitled "Nail," which issued to S. Kraemer on Sep. 21, 1937, and U.S. Pat. No. 4,932,820 entitled "Nail With Differential Holding Capabilities Along Its Shank," which issued to Schniedermeier on Jun. 12, 1990. One short coming of the fasteners described in these patents is that the heads can easily cut and/or rupture the surface fibers of the wood and/or wood-like substrate material. Another significant shortcoming of fasteners of this type is that the pull-through resistance of the fastener does not increase proportionally with an increase in the thickness of the substrate material. Independent third party testing by NTA, Inc. reveals that as the thickness of the substrate material increases, the pull-through resistance of such fasteners increases to a lesser extent.

Some people in the construction industry have improvised and resorted to using a flat washer under the head of the fastener to enlarge the effective bearing surface of the fastener. While using a washer-type device does increase the bearing surface, it also increases the relative thickness of the head of the fastener causing it to protrude above the surface of the substrate material. If the fastener and washer combination is driven in to be flush with the surface of the substrate material, then the substrate material can often be cut, compromised, and/or damaged such that it is easily susceptible to further deformation and subsequent loss of structural integrity.

Examples of nail-like fasteners used in combination with a washer-like device include U.S. Pat. No. 2,256,401 entitled "Fastener," which issued to H. Maze on Sep. 16, 1941, U.S. Pat. No. 4,860,513 entitled "Roofing Fastener," which issued to Whitman on Aug. 29, 1989, and U.S. Pat. No. 4,884,932 entitled "Decking Insulation Fastener," which issued to Meyer on Dec. 5, 1989. A short coming of the fasteners disclosed in these patents includes that the washer-like devices are not designed to prevent cutting and/or rupturing the surface fibers of the wood and/or wood-like material substrate. Similar to the way a nail head ruptures the surface fibers of the wood substrate, the washer-like device does so as well, but at a larger diameter than the nail head diameter.

Others have developed nails with enlarged heads to increase the effective bearing surface of the fastener. For example, U.S. Pat. No. 6,758,018 entitled "Power Driven Nails For Sheathing Having Enlarged Diameter Heads For Enhanced Retention And Method," which issued to Sutt, Jr. on Jul. 6, 2004, discloses a fastener with an enlarged head requiring a specific ratio between the size of the head and the size of the shank. The enlarged head specified by this ratio results in increased pull-through resistance compared to commonly used nails. Fasteners available in the marketplace under the brand name "Hurriquake" are a derivative of this patent. Testing reveals that fasteners of this type do exhibit increased pull-through resistance compared to fasteners having a smaller tradition sized head. However, when subjected to the destructive forces of only moderate wind storms the modest improvement in retention force that is realized with such fasteners is basically mute, still allowing pull-through, and still resulting in a loss of structural integrity. As a result, higher wind load forces associated with Category-5 hurricanes and/or EF-5 tornadic storm events easily overcome the benefits of such fasteners. One of the shortcomings of this design is that the geometric features of the nail head are relatively flat and planar. Therefore, the benefit of the enlarged head size compared to the shank of the fastener is limited because of the inherent detrimental benefits of the geometric shape of the head design. Specifically, enlarged head nails have been shown to include several significant failure modes. One failure mode occurs where the surface fibers of the wood substrate material become ruptured and split from the initial setting of the nail before pull-through forces are applied. Another failure mode occurs where the enlarged heads of the nails become noticeably distorted and wobbled after pulling through the substrate material, resembling an umbrella turned inside out as a result of strong winds. Yet another significant shortcoming observed in the testing was that the corresponding pull-through resistance of the nails tested in various thicknesses of substrates materials was not equivalent to the increased thickness of the substrate. In other words, in spite of the enlarged head, independent third party testing reveals that as the thickness of the substrate material increases, there is not a corresponding increase in the pull-through resistance for nails of this design.

Accordingly, there remains a need for an improved fastener head design that increases pull-through resistance of nail-like fasteners, screw-like fasteners, and bolt-like fasteners.

SUMMARY

This section provides a general summary of the disclosure, and is not a comprehensive disclosure of its full scope or all of its features.

In accordance with one aspect of the subject disclosure, a compression indentation fastener device comprising a shank and a head is provided. The shank extends along a shank axis between a first end and a second end. The head is disposed at the second end of the shank. The head generally extends outwardly from the second end of the shank in a transverse plane to define a head periphery. The transverse plane is substantially perpendicular to the shank axis. The head has an anterior side adjacent the second end of the shank and a posterior side opposite the anterior side. The anterior side of the head includes an exposed area that is arranged to impact a first surface of a substrate material. The exposed area extends between the second end of the shank and the head periphery. The anterior side of the head also includes a relief portion disposed between the shank and the head periphery. The relief portion is a depression that extends continuously about the second end of the shank. The relief portion is open at the anterior side of the head such that the relief portion receives a volume of the substrate material when the exposed area of the anterior side of the head impacts the first surface of the substrate material.

In accordance with another aspect of the subject disclosure the head includes a through hole that extends from the posterior side of the head to the anterior side of the head. The through hole is provided for receiving a fastener, such as the shank of the fastener for example. In accordance with this configuration, the exposed area extends between the through hole and the head periphery. Thus, the relief portion on the anterior side of the head is also disposed between the through hole and the head periphery and extends continuously about the through hole. Again, the relief portion is a depression that is open at the anterior side of the head to receive a volume of the substrate material when the exposed area of the anterior side of the head impacts the first surface of the substrate material. The relief portion of the anterior side of the head includes a convergent surface and a divergent surface. The convergent surface extends outwardly from the through hole at an angle to define a frustoconical structure that extends about the through hole. Meanwhile, the divergent surface extends outwardly from the convergent surface toward the head periphery.

In accordance with yet another aspect of the subject disclosure, the shank extends linearly along the shank axis, between the first and second ends. The anterior side of the head includes both an exposed area and a shank area. The exposed area is arranged to impact the first surface of the substrate material and the shank area designates that area of the anterior side where the second end of the shank meets the anterior side of the head. In accordance with this configuration, the head is offset relative to the second end of the shank. The relief portion on the anterior side of the head is thus positioned to one side of the shank. Again, the relief portion is a depression that is open at the anterior side of the head to receive a volume of the substrate material when the exposed area of the anterior side of the head impacts the first surface of the substrate material.

Accordingly, the fastener devices described herein provide a number of advantages and overcome the short comings of existing fasteners. First, the fastener head design described herein provides substantially improved retention capabilities combined with superior pull-through resistance compared to conventional small-head fasteners. In addition, the subject fastener devices overcome the short comings of using standard washer-like components that only enlarge the effective bearing surface of relatively small-head fasteners. The relief portion of the fastener devices described herein functions to laterally displace and compress areas of the substrate material that are disposed adjacent the convergent and divergent surfaces of the relief portion. This creates a volume of the substrate material that is received by the relief portion as the head impacts the first surface of the substrate material. This volume of compressed substrate material is more resistant to pull-through failures (i.e. the surface fibers of the substrate material become more resistant to cutting/rupture) thus increasing the effectiveness of the head. In other words, the relief feature actually increases the strength of the substrate material adjacent the head to resist pull-through. Second, the resulting geometry of the head is more resistant to deformation than enlarged head fasteners and standard washer-like components, which have a thin, uniform thickness and are substantially planar in shape. Accordingly, the failure mode that occurs in such fasteners where the enlarged head and/or washer-like component is turned inside out like an umbrella after pulling through the substrate material is substantially eliminated. Third, the pull-through resistance of the disclosed fasteners increases to a greater extent when the thickness of the substrate material is increased. Testing has shown that this level of fastener performance is not achieved by the small-head fasteners, the enlarged head fasteners, or the fasteners with standard washer-like components described above. Advantageously, the teachings set forth herein can be applied to a wide range of different fastener types, including nail-like fasteners, screw-like fasteners, and bolt-like fasteners.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 18 is a side perspective view of a second head portion of another exemplary compression indentation fastener device constructed in accordance with the subject disclosure where the second head portion is shown embedded in a substrate material;

FIG. 19 is a side perspective view of the second head portion of the exemplary compression indentation fastener device shown in FIG. 18 where a first head portion, a threaded shank, and a nut of the exemplary compression indentation fastener device are shown in relation to the second head portion and the substrate material;

FIG. 20 is a side perspective view of another exemplary compression indentation fastener device constructed in accordance with the subject disclosure that includes an offset head;

FIG. 21 is a side cross-sectional view of the exemplary compression indentation fastener device illustrated in FIG. 20 taken along line 21-21;

FIG. 22 is a bottom elevation view of the exemplary compression indentation fastener device illustrated in FIG. 20 looking up at the offset head;

FIG. 23 is a plot comparing the ultimate yield pull-through resistance of small-head and enlarged head fasteners to the ultimate yield pull-through resistance of the exemplary compression indentation fastener device shown in FIG. 1.

DETAILED DESCRIPTION

Figure 1:
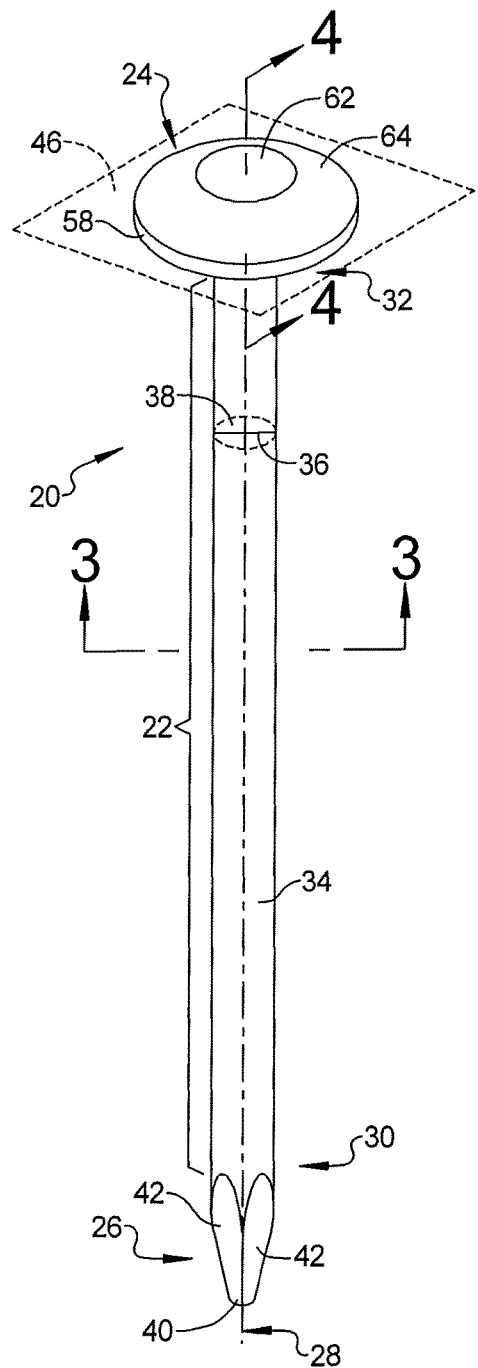
FIG. 1 is a side perspective view of an exemplary compression indentation fastener device constructed in accordance with the subject disclosure that includes a smooth shank.

Referring to the Figures, wherein like numerals indicate corresponding parts throughout the several views, a compression indentation fastener device 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. The term "substantially parallel," as used herein, means that the recited elements are exactly parallel or are arranged at an angle ranging between and including plus or minus 5 degrees. The term "substantially perpendicular," as used herein, means that the recited elements are arranged at an angle ranging between and including 85 degrees and 95 degrees.

Figure 2:
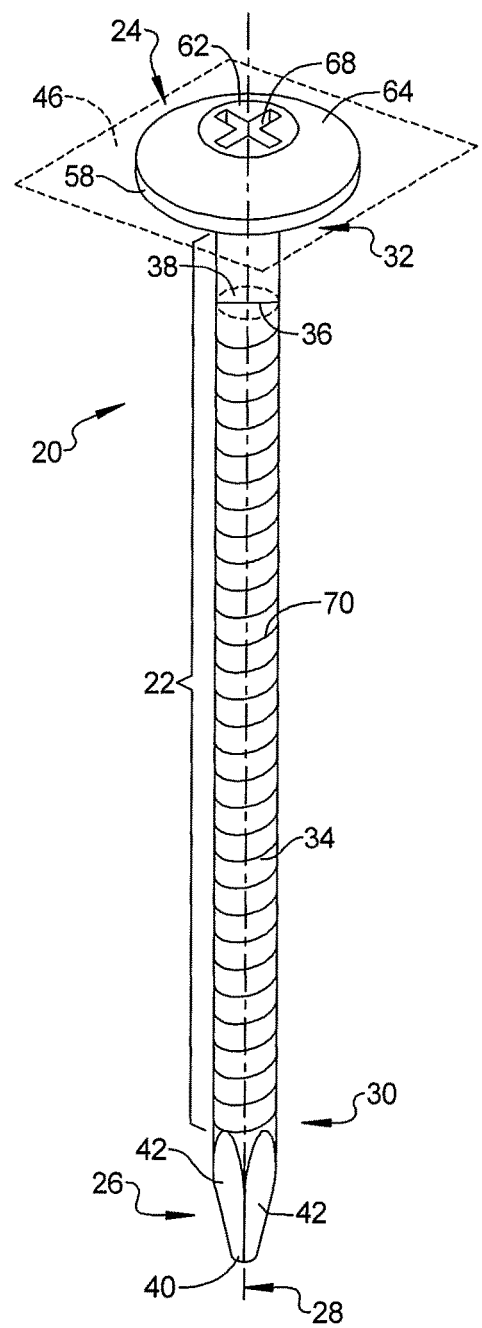
FIG. 2 is a side perspective view of another exemplary compression indentation fastener device constructed in accordance with the subject disclosure that includes a threaded shank.
Figure 3:
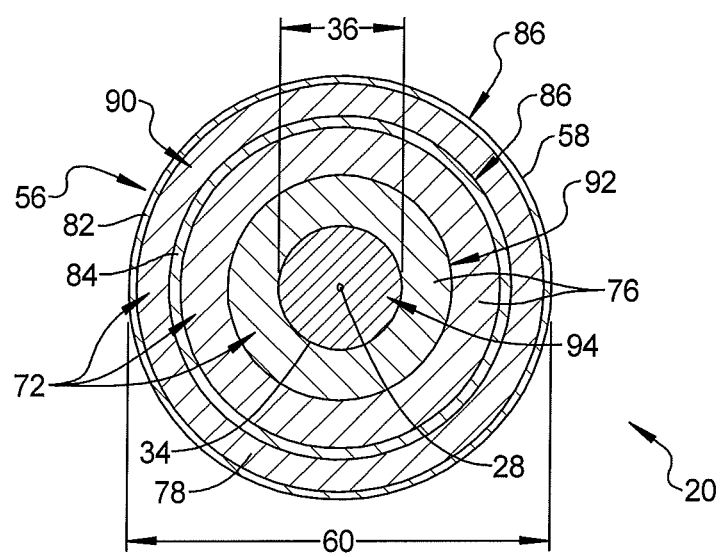
FIG. 3 is a bottom cross-sectional view of the exemplary compression indentation fastener device illustrated in FIG. 1 taken along line 3-3.

With reference to FIGS. 1 and 2, the compression indentation fastener device 20 may be provided in the form of a nail-like arrangement (FIG. 1) or a screw-like arrangement (FIG. 2). Each includes a shank 22, a head 24, and a tip 26. It should be appreciated that in the examples illustrated, the shank 22, the tip 26, and the head 24 are integral with one another forming a one-piece structure. The shank 22 extends linearly along a shank axis 28 and between a first end 30 and a second end 32. The shank 22 has an exterior surface 34 that generally extends between the first and second ends 30, 32 and that defines a shank width 36. Although other shapes are possible, in the examples shown, the exterior surface 34 of the shank 22 has a cylindrical shape. As shown in FIG. 3, the shank 22 may generally have a shank cross-section 38 that has a circular shape such that the shank width 36 equals a diameter of the shank cross-section 38. It should therefore be appreciated that the shank cross-section 38 extends perpendicularly relative to the shank axis 28.

The tip 26 is disposed at the first end 30 of the shank 22. Although a wide variety of different tip configurations may be utilized, in the examples illustrated, the tip 26 tapers from the shank width 36 at a location disposed adjacent the first end 30 of the shank 22 to a point 40 at a location that is spaced outwardly from the first end 30. The tip 26 has at least two angled sides 42. It should be appreciated that in FIGS. 1 and 2, only half of the tip 26 is visible and that the examples illustrated therein include a total of four angled sides 42. The angled sides 42 converge at the point 40 and each of the angled sides 42 is planar in shape. As such, the point 40 of the tip 26 may be disposed along the shank axis 28 (i.e. may be centered relative to the shank cross-section 38). In alternative configurations, the tip 26 may have a conical shape (FIGS. 12, 15 and 16) or may have only one angled side (not shown). Where the tip 26 includes only one angled side, the point 40 may be laterally offset relative to the shank axis 28 (not shown). It should also be appreciated that the shank 22 of the compression indentation fastener device 20 may be provided without a tip 26, where the shank 22 terminates at the first end 30 (FIG. 19).

Referring to FIGS. 1-5, the head 24 is disposed at the second end 32 of the shank 22. Accordingly, the head 24 is positioned on the shank 22 opposite the tip 26. The head 24 extends outwardly from the second end 32 of the shank 22 in a transverse plane 46 that is substantially perpendicular to the shank axis 28. In FIGS. 1-5, the head 24 is centered about the shank axis 28; however, other arrangements are possible where the head 24 is offset relative to the shank axis 28 (FIGS. 20-22). It should be appreciated that while the head 24 generally extends outwardly in the transverse plane 46, the head 24 is not necessary planar. Instead, the transverse plane 46 is arranged relative to the head 24 such that the transverse plane 46 bisects the head 24. The head 24 has an anterior side 48 adjacent the second end 32 of the shank 22 and a posterior side 50 opposite the anterior side 48. The head 24 has a head thickness 54 extending parallel to the shank axis 28 between the anterior and posterior sides 48, 50 of the head 24. As shown in FIG. 3, the head 24 has a head cross-section 56 that extends perpendicularly relative to the shank axis 28 and the head cross-section 56 is bounded by a head periphery 58. The head cross-section 56 has a circular shape in the examples shown in FIGS. 1-5. However, the head 24 may be formed in various different shapes and sizes. By way of example and without limitation, the head cross-section 56 may alternatively have the shape of an oval, a triangle, a square, a rectangle, a hexagon, or an octagon. The head periphery 58 defines a head width 60 that is larger than the shank width 36. The head periphery 58 generally extends between the anterior and posterior sides 48, 50 of the head 24 in a direction that is substantially parallel to the shank axis 28. In the examples illustrated in FIGS. 1-5, the head periphery 58 has a cylindrical shape. Notwithstanding these examples, the head periphery 58 may have a shape other than that of a cylinder (FIG. 19).

The posterior side 50 of the head 24 may be divided into an inner surface area 62 and an outer surface area 64. The shank axis 28 intersects the inner surface area 62 and the outer surface area 64 generally extends about at least part of the inner surface area 62. In the examples illustrated in FIGS. 1-5, the inner surface area 62 of the posterior side 50 of the head 24 is substantially parallel to the transverse plane 46 and is therefore substantially perpendicular to the shank axis 28. The inner surface area 62 is also centered about the shank axis 28 in FIGS. 1-5, although other arrangements are possible (FIGS. 20-22). The inner surface area 62 is thus configured for contact with a tool. Meanwhile, the outer surface area 64 of the posterior side 50 may have a domed shape.

Where the compression indentation fastener device 20 is provided in the nail-like arrangement, as illustrated in FIG. 1, the tool may be, for example, a hammer. Generally, such a hammer may be swung into contact with the inner surface area 62 of the posterior side 50 of the head 24 in order to drive the tip 26 and subsequently the shank 22 into a substrate material 66 (shown in FIGS. 6-8). Where the compression indentation fastener device 20 is provided in the screw-like arrangement, the tool may be, for example, a screw driver. Accordingly, the head 24 of the compression indentation fastener device 20 may include a tool receiving recess 68 (FIG. 2). The tool receiving recess 68 may generally extend into the head 24 from the inner surface area 62 of the posterior side 50 toward the second end 32 of the shank 22. The geometric shape of the tool receiving recess 68 is configured to receive part of the tool such that the compression indentation fastener device 20 may be rotationally driven by the tool. By way of example and without limitation, the tool receiving recess 68 may be configured to receive a flat head tool portion, a Phillips head tool portion, a Torx head tool portion, or a hex head tool portion, a square head tool portion, a Pozidriv head tool portion, a Polydrive head tool portion, or other like variants. Where the compression indentation fastener device 20 is provided as in the screw-like arrangement, the compression indentation fastener device 20 further includes a retention feature 70 (shown in FIG. 2) that extends outwardly from the exterior surface 34 of the shank 22 for engagement with the substrate material 66 (shown in FIGS. 6-8). By way of example and without limitation, the retention feature 70 is illustrated as threads in FIG. 2, which extend helically about the exterior surface 34 of the shank 22. Thus, the retention feature 70 (i.e. the threads) cut into the substrate material 66 as the tool rotates the head 24 and the shank 22, moving the shank 22 longitudinally relative to the substrate material 66 along the shank axis 28.

As shown in FIGS. 3-8, the anterior side 48 of the head 24 includes an exposed area 72 that is outward of the shank 22. The exposed area 72 is thus configured for contact with a first surface 74 (shown in FIGS. 6-8) of the substrate material 66. The anterior side 48 of the head 24 includes a relief portion 76 disposed between the shank 22 and the head periphery 58. The relief portion 76 is a depression that extends into the head 24 toward the posterior side 50 and that has a concave shape. Thus, the concave shape of the relief portion 76 is open to the anterior side 48 of the head 24. The relief portion 76 also extends continuously about the second end 32 of the shank 22 without interruption. In the examples illustrated in FIGS. 3-8, where the shank cross-section 38 is circular, the relief portion 76 circumscribes the second end 32 of the shank 22. Therefore, it should be appreciated that the relief portion 76 and the posterior side 50 of the head 24 may be configured such that the head thickness 54 is variable across the head width 60. The relief portion 76 may be spaced inward of the head periphery 58 to define a bearing surface 78. Accordingly, the bearing surface 78 is disposed between the relief portion 76 and the head periphery 58. As such, the bearing surface 78 is located within the exposed area 72 on the anterior side 48 of the head 24. Due to its location within the exposed area 72, the bearing surface 78 is configured for contact with the first surface 74 of the substrate material 66. Although other geometries are possible, the bearing surface 78 illustrated in FIGS. 3-8 has a planar, ring-like shape.

The bearing surface 78 defines a reference plane 80 that is substantially parallel to the transverse plane 46 and that is substantially perpendicular to the shank axis 28. In configurations where the bearing surface 78 is planar and perpendicular to the shank axis 28, the reference plane 80 extends along the bearing surface 78. In configurations where the bearing surface 78 is non-planar and/or is not perpendicular to the shank axis 28, the reference plane 80 is tangential to the bearing surface 78. In other words, the reference plane 80 touches the bearing surface 78 at points that are most distant from the inner surface area 62 of the posterior side 50 (i.e. points that are closest to the first end 30 of the shank 22). Depending on the geometry of the head 24, the reference plane 80, as defined by the bearing surface 78, may be spaced from the transverse plane 46 or may be co-extensive with the transverse plane 46. Based upon the foregoing description, it should be appreciated the posterior side 50 of the head 24 is located to one side A of the reference plane 80 and the shank 22 is located to an opposite side B of the reference plane 80.

Still referring to FIGS. 3-8, the bearing surface 78 extends between an outer transition radius 82 and an inner transition radius 84. The outer transition radius 82 is disposed between the bearing surface 78 and the head periphery 58 meanwhile the inner transition radius 84 is disposed between the bearing surface 78 and the relief portion 76. The outer transition radius 82 and the inner transition radius 84 provide round, gradual transitions between the head periphery 58, the bearing surface 78, and the relief portion 76. Consequently, the outer transition radius 82 and the inner transition radius 84 help prevent surface fibers at the first surface 74 of the substrate material 66 from becoming cut as the bearing surface 78 is driven into the substrate material 66.

As shown in FIG. 3, the bearing surface 78 has an inner boundary 86 adjacent the inner transition radius 84 and an outer boundary 88 adjacent the outer transition radius 82. Along the anterior side 48 of the head 24, the bearing surface 78 thus defines a bearing surface area 90 that extends between the inner and outer boundaries 86, 88 of the bearing surface 78. Also along the anterior side 48 of the head 24, the relief portion 76 defines a relief portion area 92 that extends between the inner boundary 86 of the bearing surface 78 and the exterior surface 34 of the shank 22. In cross-section, the shank 22 defines a shank area 94 that is co-extensive with the shank cross-section 38. Accordingly, the bearing surface area 90 and the relief portion area 92 are included within the exposed area 72 of the anterior side 48 of the head 24. From this view, it should also be appreciated that moving sequentially in a direction pointing radially outward from the shank axis 28, the exterior surface 34 of the shank 22, the relief portion 76, the inner transition radius 84, the bearing surface 78, the outer transition radius 82, and the head periphery 58 are concentrically arranged. Thus, the shank area 94, the relief portion area 92, and the bearing surface area 90 are concentrically arranged in the aforementioned order when moving in the direction pointing radially outward from the shank axis 28.

Figure 4:
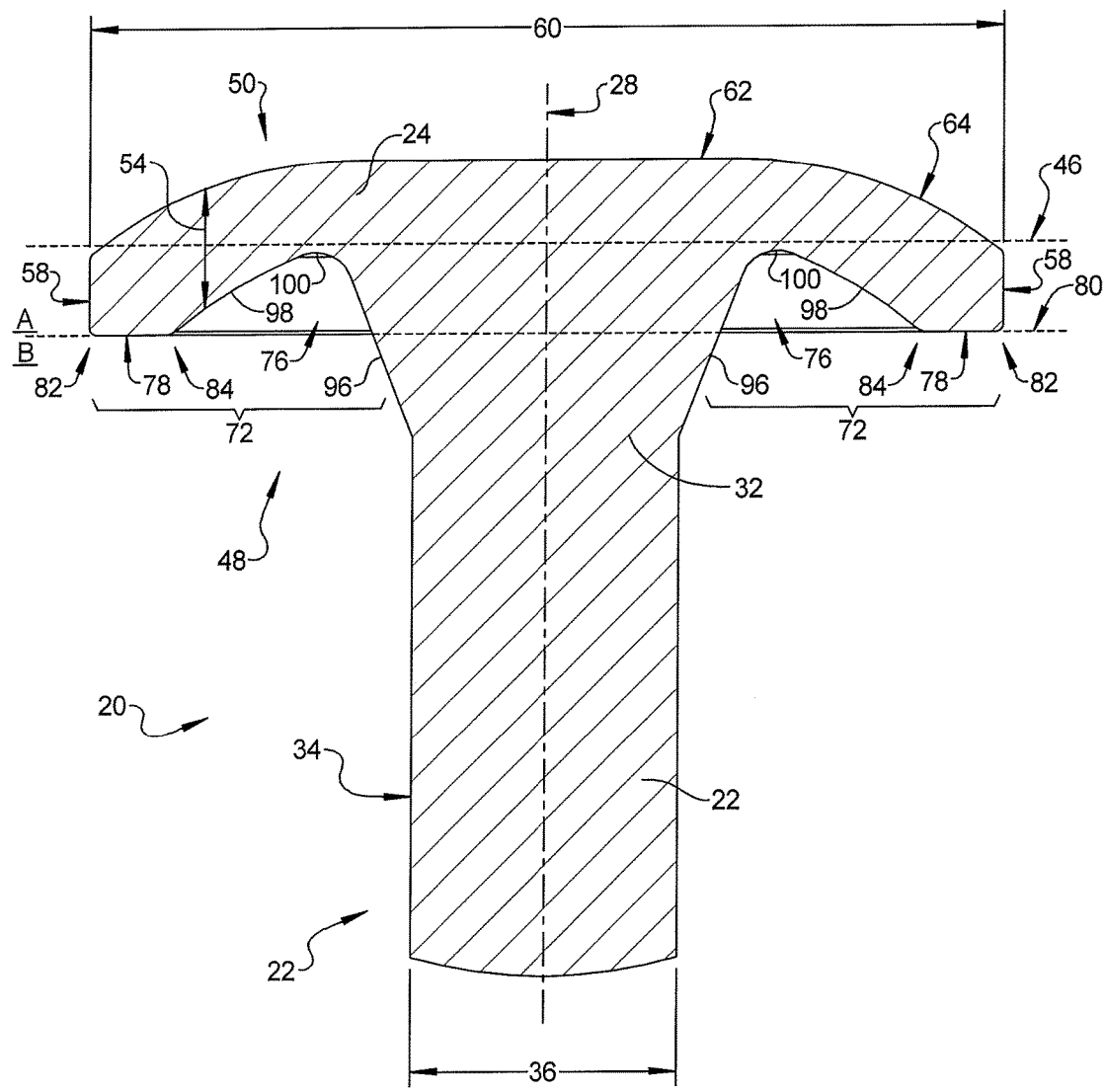
FIG. 4 is a side cross-sectional view of a portion of the exemplary compression indentation fastener device illustrated in FIG. 1 taken along line 4-4.
Figure 5:
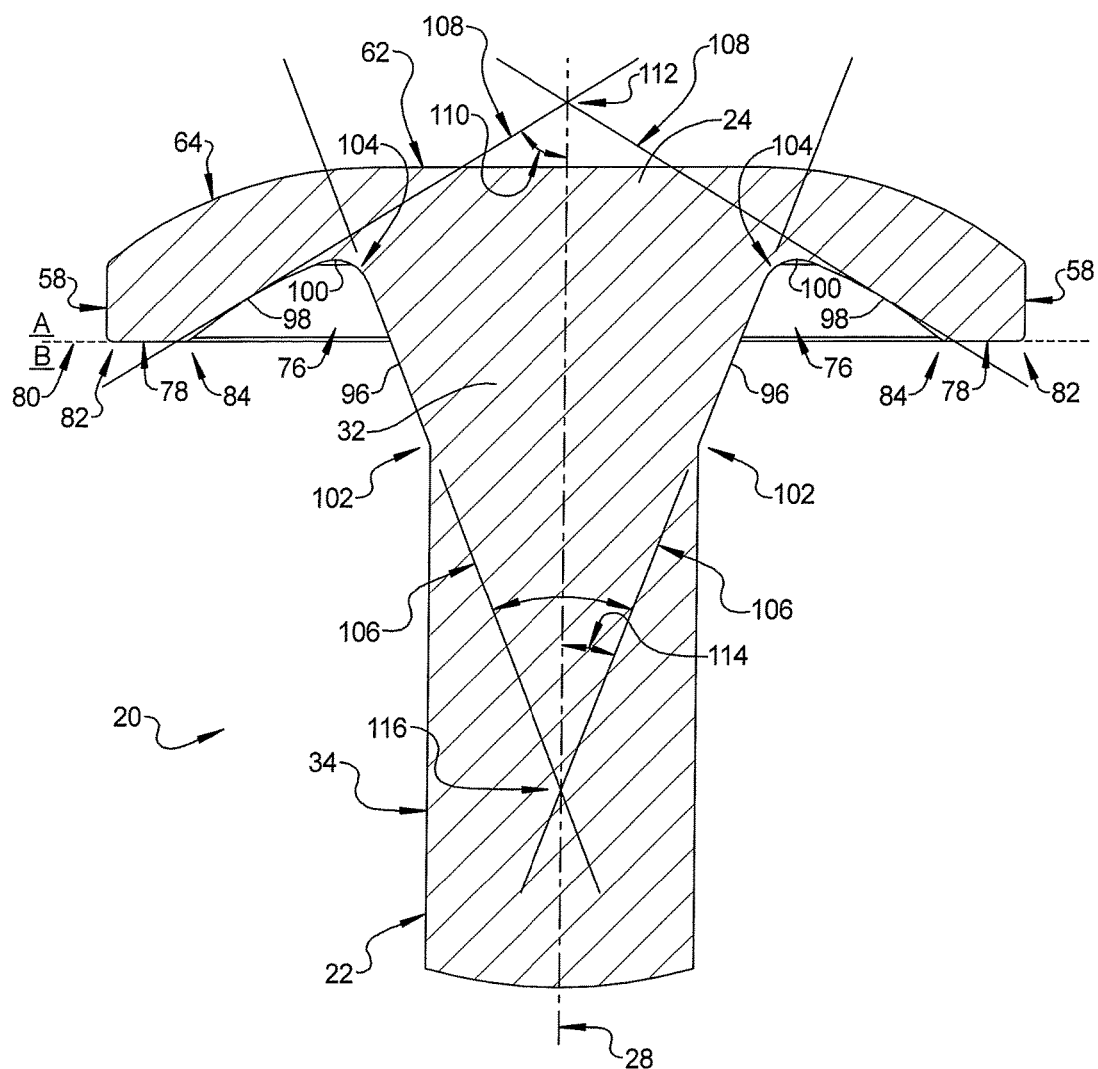
FIG. 5 is another side cross-sectional view of the portion of the exemplary compression indentation fastener device illustrated in FIG. 4 further including reference lines that illustrate the geometry of the exemplary compression indentation fastener device.

With reference to FIGS. 4 and 5, the relief portion 76 generally includes a convergent surface 96 and a divergent surface 98. The convergent surface 96 extends outwardly from the second end 32 of the shank 22. The divergent surface 98 extends outwardly from the convergent surface 96 to the bearing surface 78. The convergent and divergent surfaces 96, 98 of the relief portion 76 join one another at a peak 100 of the relief portion 76. The peak 100 is disposed between the reference plane 80 and the posterior surface of the head 24 and may generally be defined as a location where the relief portion 76 is closest to the posterior side 50 of the head 24 (i.e. a location where the relief portion 76 is farthest from the first end 30 of the shank 22). The convergent surface 96 extends between a first terminus 102 and a second terminus 104 to define a convergent surface reference line 106. The first terminus 102 is disposed along the second end 32 of the shank 22 and the second terminus 104 is disposed at the peak 100 of the relief portion 76. The divergent surface 98 can be more particularly described as extending between the second terminus 104 of the convergent surface 96 and the inner transition radius 84 and defines a divergent surface reference line 108. The divergent surface reference line 108 intersects the shank axis 28 at a first acute angle 110 and at a first location 112 disposed on the side A of the reference plane 80 where the posterior side 50 of the head 24 is located. The convergent surface reference line 106 intersects the shank axis 28 at a second acute angle 114 and at a second location 116 that is disposed on the opposite side B of the reference plane 80 where the shank 22 is located. Although various geometries for the convergent and divergent surfaces 96, 98 are possible, in the example shown in FIG. 5, the first acute angle 110 formed between the divergent surface reference line 108 and the shank axis 28 is greater than the second acute angle 114 formed between the convergent reference line and the shank axis 28.

Figure 6:
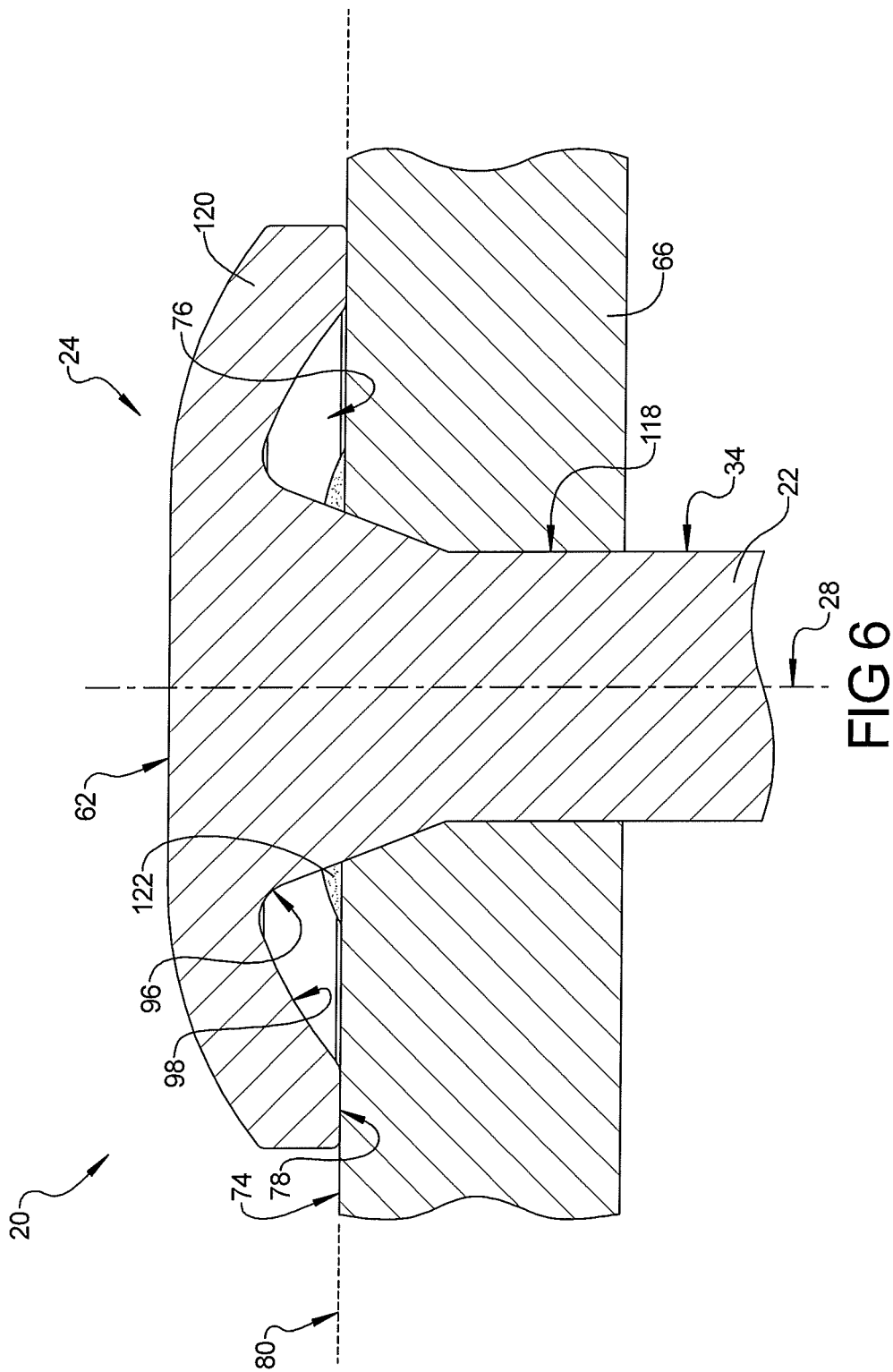
FIG. 6 is another side cross-sectional view of the portion of the exemplary compression indentation fastener device illustrated in FIG. 4 where exemplary compression indentation fastener device is shown extending into a substrate material to define a first impacted position.
Figure 7:
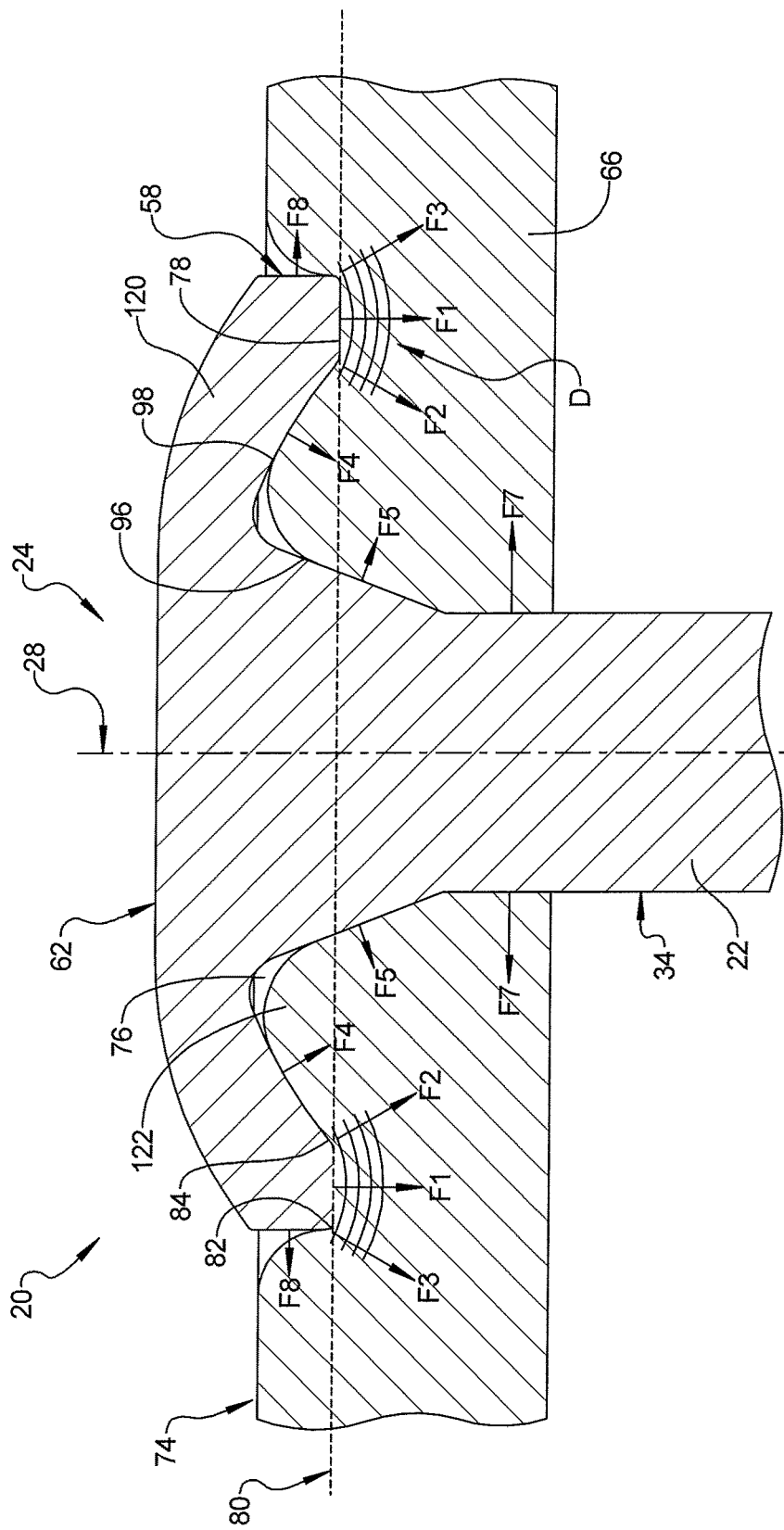
FIG. 7 is another side cross-sectional view of the portion of the exemplary compression indentation fastener device illustrated in FIG. 4 where exemplary compression indentation fastener device is shown extending into the substrate material to define an intermediate impacted position.
Figure 8:
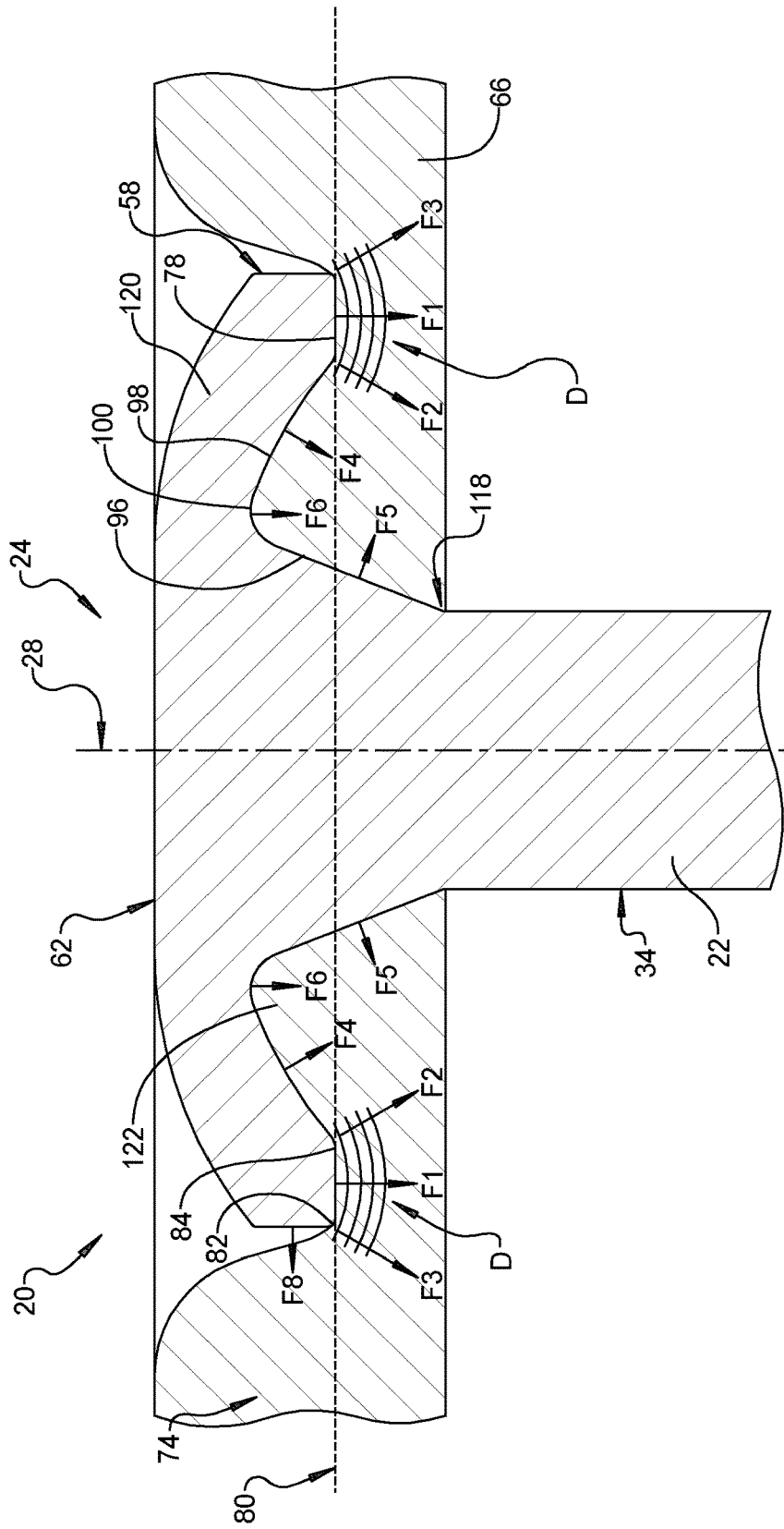
FIG. 8 is another side cross-sectional view of the portion of the exemplary compression indentation fastener device illustrated in FIG. 4 where exemplary compression indentation fastener device is shown extending into the substrate material to define a second impacted position.

With reference to FIGS. 1, 2, and 6-8, the shank 22, the tip 26, and the head 24 of the compression indentation fastener device 20 are movable together between a first impacted position (FIG. 6) and a second impacted position (FIG. 8). It should be appreciated that any number of intermediate positions are possible between the first and second impacted positions with one such intermediate position being illustrated in FIG. 7. In both of the first and second impacted positions, the shank 22 is disposed in a hole 118 in the substrate material 66, where the tip 26 and then the shank 22 have entered the substrate material 66 from the first surface 74. The hole 118 in the substrate material 66 may be created prior to insertion of the tip 26 and shank 22 into the substrate material 66 or alternatively may be created by the tip 26 and the shank 22 when they enter and moved through the substrate material 66. In the first impacted position, which is illustrated in FIG. 6, the reference plane 80 of the bearing surface 78 is aligned with the first surface 74 of the substrate material 66 such that the bearing surface 78 sits flush in contact with the first surface 74 of the substrate material 66. Thus, the head 24 has not yet been driven into the substrate material 66 when the compression indentation fastener device 20 is in the first impacted position. In the intermediate position shown in FIG. 7, the head 24 has been partially driven into the substrate material 66 such that the reference plane 80 of the bearing surface 78 is inward of the first surface 74 of the substrate material 66 (e.g. the reference plane 80 is below the first surface 74 of the substrate material 66 when the compression indentation fastener device 20 is oriented with the shank axis 28 extending vertically). In the second impacted position, which is shown in FIG. 8, the head 24 has been driven completely in the substrate material 66. In this position, the inner surface area 62 of the posterior side 50 of the head 24 is aligned with the first surface 74 of the substrate material 66 such that the inner surface area 62 of the posterior side 50 of the head 24 is flush with the first surface 74 of the substrate material 66.

The head 24 is made of a rigid material 120 that resists deformation when the shank 22, the tip 26, and the head 24 of the compression indentation fastener device 20 move together from the first impacted position to the second impacted position. As the term is used herein, "rigid" is a defined hardness of the head 24 relative to the substrate material 66, where the rigid material 120 of the head 24 is harder than the substrate material 66. The shank 22 and the tip 26 may also be made as the rigid material 120, or alternatively, may be made of a different material. The substrate material 66 is a solid as opposed to a liquid, gas, gel, or slurry and has the geometric form of a board or a sheet. The substrate material 66 may be a fibrous material and may be made of wood or a wood-like material. For example, the substrate material 66 may be selected from a group consisting of: lumber, siding, plywood, fiberboard, and oriented strand board. In accordance with this example, the rigid material 120 of the head 24 may have a hardness of at least 3.5 on the Mohs hardness scale, which exceeds the hardness of the substrate materials 66 listed. More particularly, the rigid material 120 of the head 24 may range from 3.5 to 6.5 on the Mohs hardness scale. By virtue of the relative hardness of the rigid material 120 forming the head 24 in comparison to the softer substrate material 66, the substrate material 66 yields to the bearing surface 78 and the convergent and divergent surfaces 96, 98 of the relief portion 76 as the head 24 is driven into the substrate material 66 towards the second impacted position. As will be explained in greater detail below, this causes the substrate material 66 to compress and shift laterally at locations adjacent the bearing surface 78 and the convergent and divergent surfaces 96, 98 of the relief portion 76, strengthening the substrate material 66 to increase pull-through resistance.

With reference to FIGS. 7 and 8 in particular, the compression indentation fastener device 20 applies a plurality of forces F1, F2, F3, F4, F5, F6, F7, F8 to the substrate material 66 as the compression indentation fastener device 20 moves from the first impacted position to the second impacted position. It should be appreciated that the plurality of forces F1, F2, F3, F4, F5, F6, F7, F8 are normal forces, meaning that they are oriented perpendicularly relative the respective surfaces of the compression indentation fastener device 20. As the compression indentation fastener device 20 moves from the first impacted position to the second impacted position, the bearing surface 78 applies a first force F1 to the substrate material 66 to form an area of densely compacted substrate D in the substrate material 66 adjacent the bearing surface 78. The density of the surface fibers in the substrate material 66 is thus increased in the area of densely compacted substrate D. As shown in FIG. 7, the first force F1 may be applied in a direction that is substantially parallel to the shank axis 28 where the bearing surface 78 is substantially perpendicular to the shank axis 28. The area of densely compacted substrate D in the substrate material 66 adjacent the bearing surface 78 increases the pull-through resistance of the compression indentation fastener device 20. To each side of the bearing surface 78, the inner transition radius 84 applies a second force F2 to the substrate material 66 and the outer transition radius 82 applies a third force F3 to the substrate material 66 in divergent directions. The divergent surface 98 of the relief portion 76 applies a fourth force F4 to the substrate material 66 and the convergent surface 96 of the relief portion 76 applies a fifth force F5 to the substrate material 66. The fourth and fifth forces F4, F5 operate in converging directions that are oblique to the shank axis 28. Accordingly, the convergent and divergent surfaces 96, 98 laterally displace and compress the substrate material 66 at locations adjacent the convergent and divergent surfaces 96, 98. As shown in FIG. 8, the peak 100 of the relief portion 76 may apply a sixth force F6 to the substrate material 66 in a direction that is substantially parallel to the shank axis 28. Together, the fourth, fifth, and sixth forces F4, F5, F6 form a volume of substrate 122 that substantially fills the relief portion 76 and the fourth, fifth, and sixth forces F4, F5, F6 subsequently compact the volume of substrate 122 due to the converging directions of these forces. The compacted volume of substrate 122 is thus trapped within the relief portion 76, which helps prevent the surface fibers of the substrate material 66 from slipping laterally or radially past one another as the head 24 moves into the substrate material 66. This also increases the pull-through resistance of the compression indentation fastener device 20.

Again with reference to FIG. 7, the exterior surface 34 of the shank 22 applies a seventh force F7 to the substrate material 66 that is adjacent the shank 22 and the head periphery 58 applies an eighth force F8 to the substrate material 66 that is adjacent the head periphery 58. The seventh and eighth forces F7, F8 may be applied in a direction that is substantially perpendicular to the shank axis 28, meaning that the seventh and eighth forces F7, F8 are directed outwardly on the substrate material 66 relative to the shank axis 28. Although other geometries may produce different results, the aforementioned forces shown in FIGS. 7 and 8 are numbered consecutively in order of decreasing magnitude where higher numbered forces correspond to forces of lesser magnitude. Accordingly, the magnitude of the plurality of forces F1, F2, F3, F4, F5, F6, F7, F8 may be expressed by the following relationship:

$$F1>F2>F3>F4>F5>F6>F7>F8$$

Because the bearing surface 78 creates the area of densely compacted substrate D in the substrate material 66 at a location adjacent the bearing surface 78 and because the inner transition radius 84 and the outer transition radius 82 are rounded and provide a smooth reduction in force between the first force F1 applied by the bearing surface 78, the fourth force F4 applied by the divergent surface 98, and the eight force F8 applied by the head periphery 58, the surface fibers of the substrate material 66 are less prone to becoming cut and/or ruptured. These features thus add to the pull-through resistance of the compression indentation fastener device 20.

Figure 9:
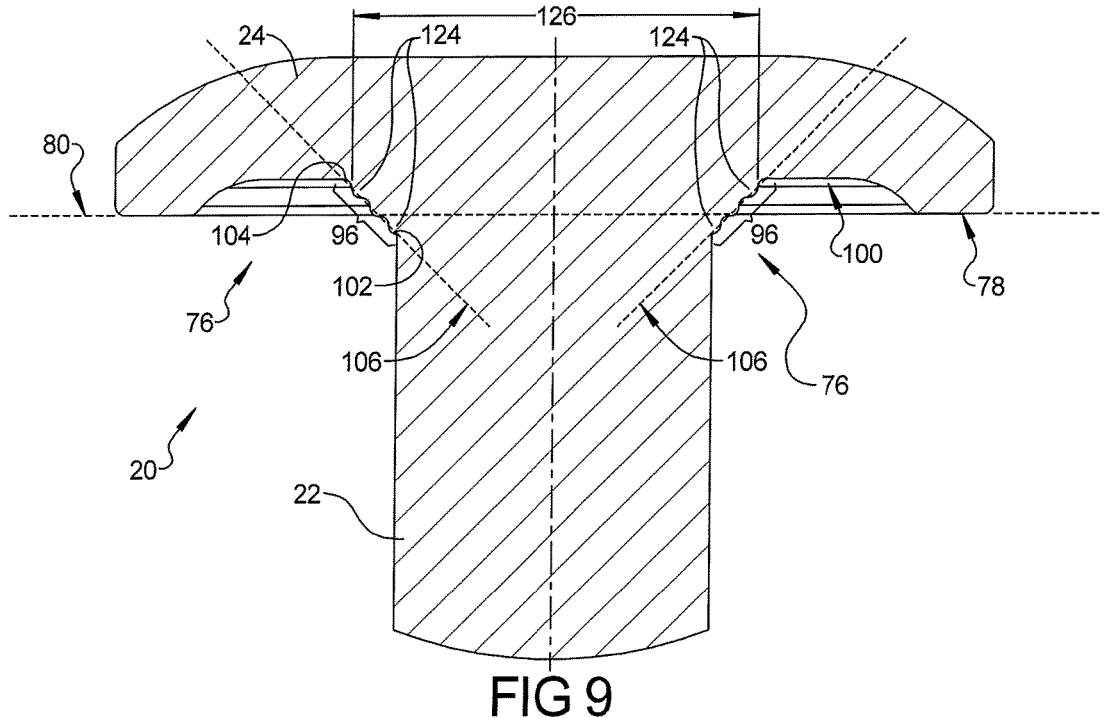
FIG. 9 is a side cross-sectional view of a portion of another exemplary compression indentation fastener device constructed in accordance with the subject disclosure that includes a convergent surface having a series of steps.
Figure 10:
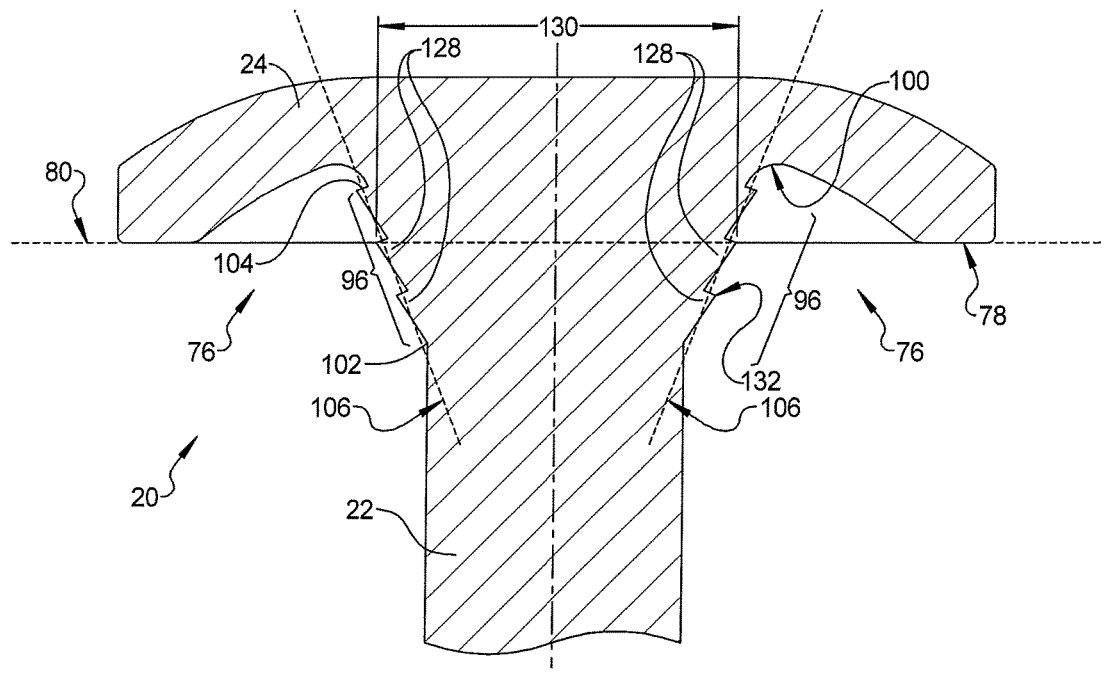
FIG. 10 is a side cross-sectional view of a portion of another exemplary compression indentation fastener device constructed in accordance with the subject disclosure that includes a convergent surface with one or more teeth.

With reference to FIGS. 9 and 10, variations of the compression indentation fastener device 20 are shown where the convergent surface 96 of the relief portion 76 has been modified. As shown in FIG. 9, the convergent surface 96 may include a series of steps 124 or shoulders that are provided for contact with the substrate material 66. Each step 124 in the series of steps 124 may have an annular shape and a step diameter 126. The step diameters 126 of the series of steps 124 may increase moving from the first terminus 102 of the convergent surface 96 to the second terminus 104 of the convergent surface 96 such that the convergent surface 96 gets progressively wider moving from the second end 32 of the shank 22 toward the peak 100 of the relief portion 76. In accordance with this configuration, the convergent surface reference line 106 generally extends tangentially to each step 124 in the series and the peak 100 of the relief portion 76 may have a planar, ring-like shape. The series of steps 124 may extend along all or part of the convergent surface 96 and thus may be disposed above, below, or above and below the reference plane 80 of the bearing surface 78. As shown in FIG. 10, the convergent surface 96 may include one or more teeth 128 that are provided for engagement with the substrate material 66. Each of the one or more teeth 128 may have an annular shape and an outside diameter 130. The outside diameters 130 of the one or more teeth 128 may increase moving from the first terminus 102 of the convergent surface 96 to the second terminus 104 of the convergent surface 96 such that the convergent surface 96 gets progressively wider moving from the second end 32 of the shank 22 toward the peak 100 of the relief portion 76. Each of the one or more teeth 128 may have ramp-like profile that tapers to a sharp edge 132. The sharp edge 132 is configured to bite into the hole 118 in the substrate material 66 to help retain the compression indentation fastener device 20 in the hole 118 and prevent the compression indentation fastener device 20 from backing out of the substrate material 66. In accordance with this configuration, the convergent surface reference line 106 generally intersects the sharp edge 132 of each of the one or more teeth 128. The one or more teeth 128 may extend along all or part of the convergent surface 96 and thus may be disposed above, below, or above and below the reference plane 80 of the bearing surface 78.

With reference to FIGS. 11-14, an alternative configuration of the nail-like compression indentation fastener device 20 of FIG. 1 is illustrated. In accordance with this configuration, the head 24 is split into two component parts, a first head portion 134 and a second head portion 136. The first head portion 134 includes the relief portion 76 and the bearing surface 78. The second head portion 136 is integral with the shank 22 and the tip 26 of the compression indentation fastener device 20. The first and second head portions 134, 136 are discrete components and together cooperate to form the head 24 of the compression indentation fastener device 20. Optionally, the second head portion 136, the shank 22, and the tip 26 may be in the form of a conventional nail-like fastener 137a. As such, this configuration allows for the creation of the compression indentation fastener device 20 described herein by fitting the first head portion 134 on a conventional nail-like fastener 137a. The first head portion 134 defines the outer surface area 64 of the posterior side 50, the head periphery 58, the bearing surface 78, the inner transition radius 84, the outer transition radius 82, the convergent surface 96 of the relief portion 76, the divergent surface 98 of the relief portion 76, and the peak 100 of the relief portion 76. The first head portion 134 further includes a through hole 138 that extends completely through the first head portion 134. The through hole 138 has a size and shape that is configured to receive the shank 22. The first head portion 134 may also include a counter-bore 140 that extends peripherally about the through hole 138, adjacent the posterior side 50 of the head 24. The counter-bore 140 has a size and shape that is configured to receive the second head portion 136 such that the second head portion 136 sits flush with the first head portion 134 at the posterior side 50 of the head 24. The shank 22 and the second head portion 136 and thus the through hole 138 and the counter-bore 140 may be provided with a variety of different cross-sectional shapes. By way of example and without limitation, the shank 22, the second head portion 136, the through hole 138, and the counter-bore 140 illustrated in FIGS. 11-14 are all circular in cross-section. As shown in FIGS. 11-14, both the through hole 138 and the counter-bore 140 may be co-axially arranged about the shank axis 28.

Figure 11:
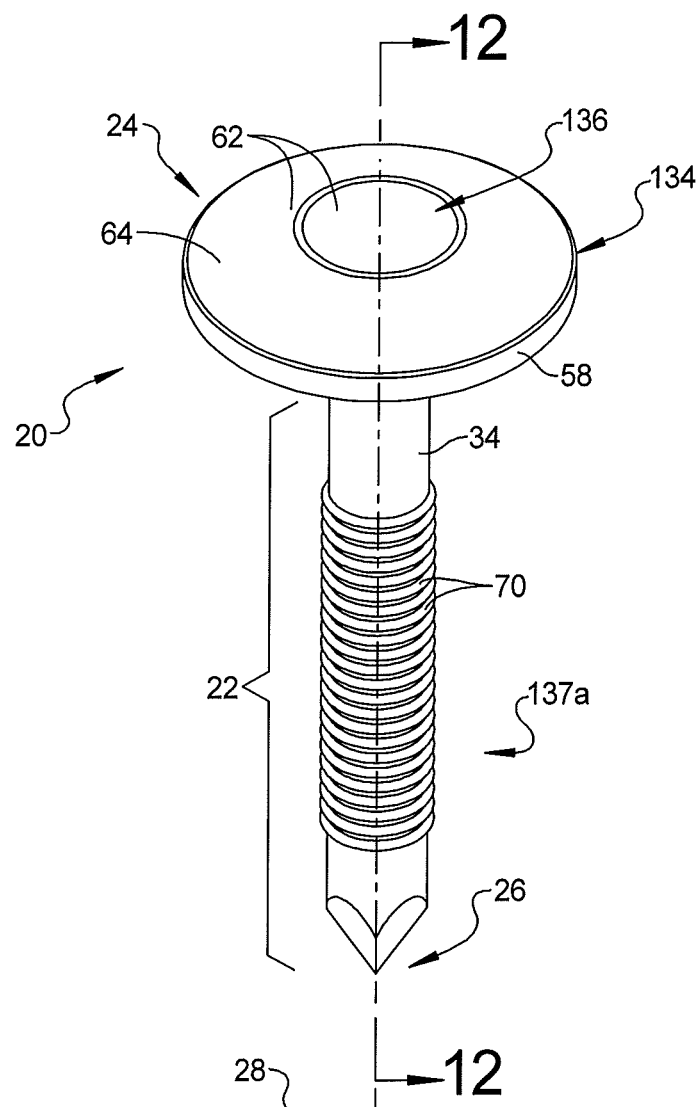
FIG. 11 is a side perspective view of another exemplary compression indentation fastener device constructed in accordance with the subject disclosure that includes a first head portion, a second head portion, and a ribbed shank.
Figure 12:
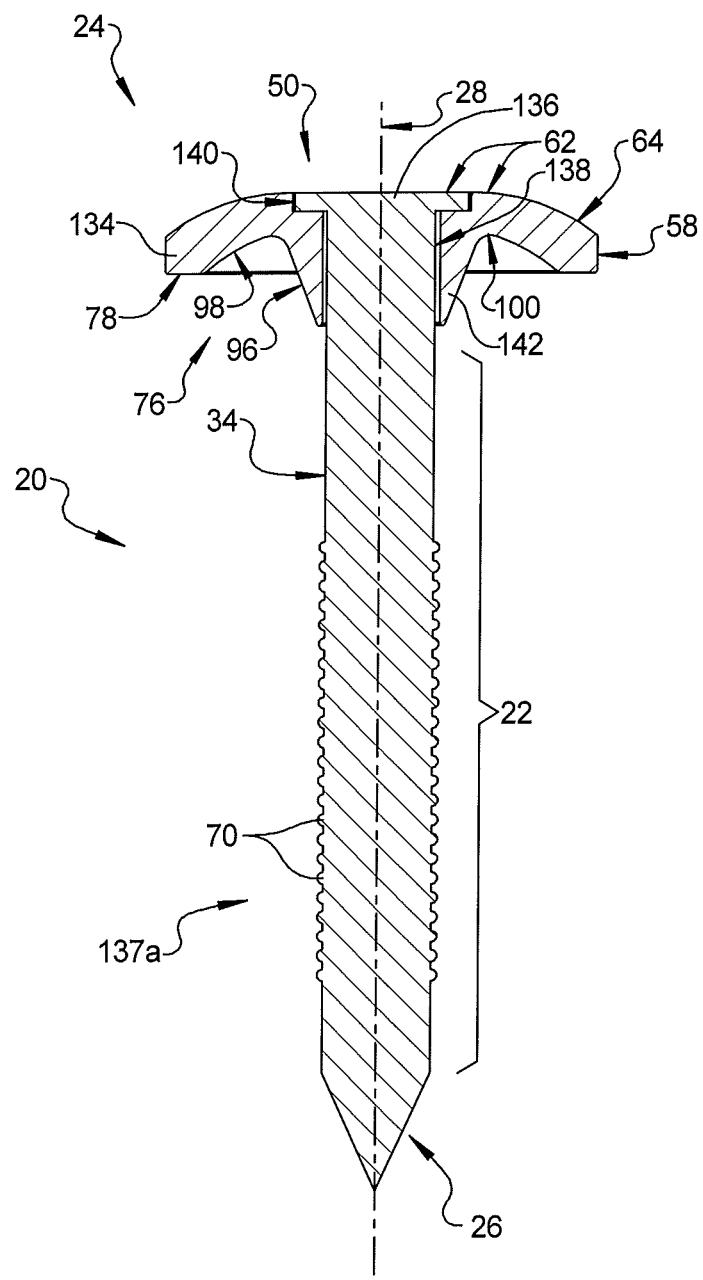
FIG. 12 is a side cross-sectional view of the exemplary compression indentation fastener device illustrated in FIG. 11 taken along line 12-12.
Figure 13:
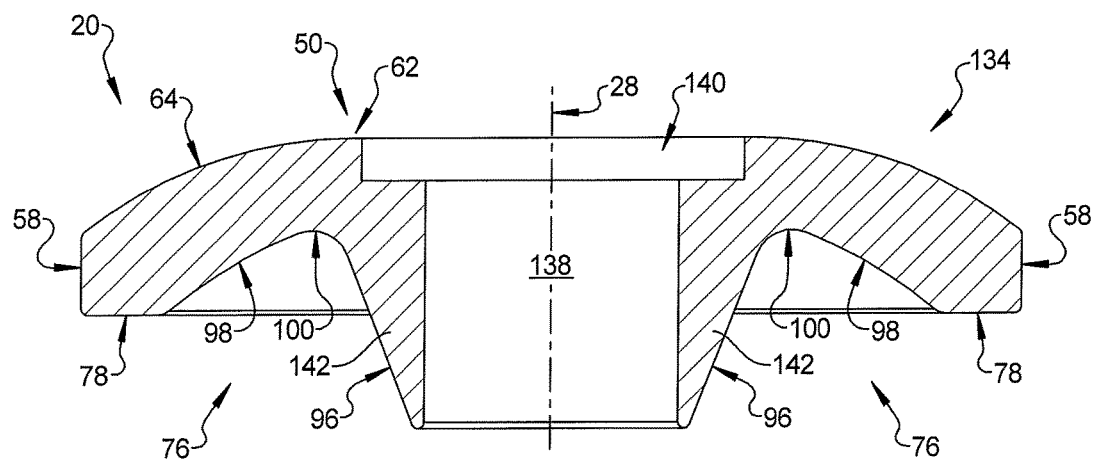
FIG. 13 is a side cross-sectional view of the second head portion of the exemplary compression indentation fastener device illustrated in FIG. 12.
Figure 14:
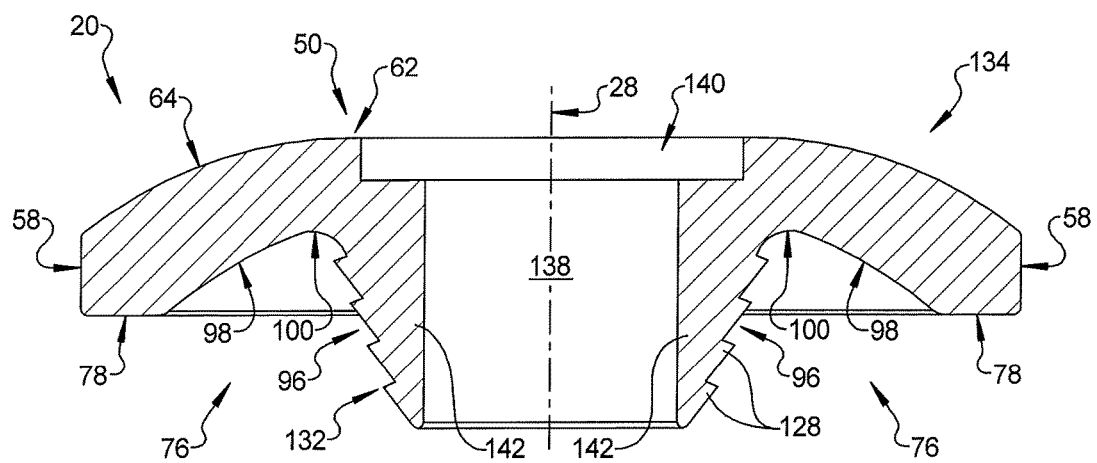
FIG. 14 is a side cross-sectional view of a second head portion of another exemplary compression indentation fastener device constructed in accordance with the subject disclosure where the second head portion includes a convergent surface with one or more teeth.

In the example illustrated FIGS. 11-14, the first and second head portions 134, 136 cooperatively define the inner surface area 62 of the posterior side 50 and the convergent surface 96 forms a frustoconical structure 142 adjacent the through hole 138. In FIGS. 11 and 12, the retention feature 70 of the shank 22 is shown as a series of annular rings that extend about the exterior surface 34 of the shank 22 in a parallel, spaced relationship. In contrast to the threads illustrated in FIG. 2, the series of annular rings illustrated in FIGS. 11 and 12 are substantially parallel to the transverse plane 46 and the series of annular rings are annular in shape rather than helical. It should be appreciated that the series of annular rings engage the substrate material 66 and therefore increase pull-out resistance. In use, the first and second head portions 134, 136 may be pre-assembled where the tip 26 and then the shank 22 are inserted into the through hole 138 and the first head portion 134 is slid along the shank 22 until the second head portion 136 is received by the counter-bore 140. As such, the compression indentation fastener device 20 shown in FIGS. 11 and 12 may be driven into the substrate material 66 as an assembly. Alternatively, the first head portion 134 shown in FIG. 13 may first be driven into the substrate material 66 in singularity (i.e. by itself). The tip 26 and/or the shank 22 may be positioned in the through hole 138 of the first head portion 134 and then the second head portion 136, the shank 22, and the tip 26 can subsequently be driven into the substrate material 66. In this way, the through hole 138 helps guide the tip 26 and the shank 22 as the compression indentation fastener device 20 is driven into the substrate material 66. Optionally, the hole 118 may be drilled into the substrate material 66 prior to positioning the tip 26 and/or the shank 22 in the through hole 138 of the first head portion 134 where the through hole 138 of the first head portion 134 may be used as a drill guide. As shown in FIG. 14, the convergent surface 96 again includes one or more teeth 128. Because the sharp edge 132 of the one or more teeth 128 engages the substrate material 66, the one or more teeth 128 help secure the first head portion 134 to the substrate material 66. This is particularly advantageous where the first head portion 134 is first driven into the substrate material 66 before the tip 26 and/or shank 22 are positioned in the through hole 138 of the first head portion 134 and are driven into the substrate material 66.

Figure 15:
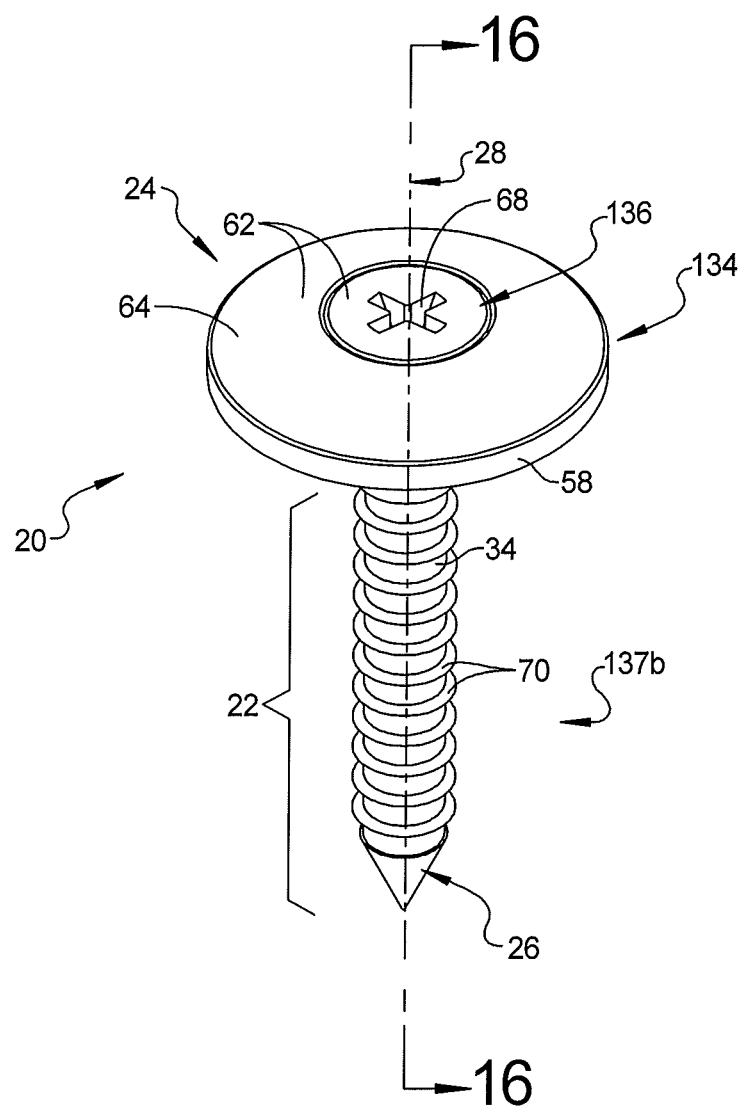
FIG. 15 is a side perspective view of another exemplary compression indentation fastener device constructed in accordance with the subject disclosure that includes a first head portion, a second head portion, and a threaded shank.
Figure 16:
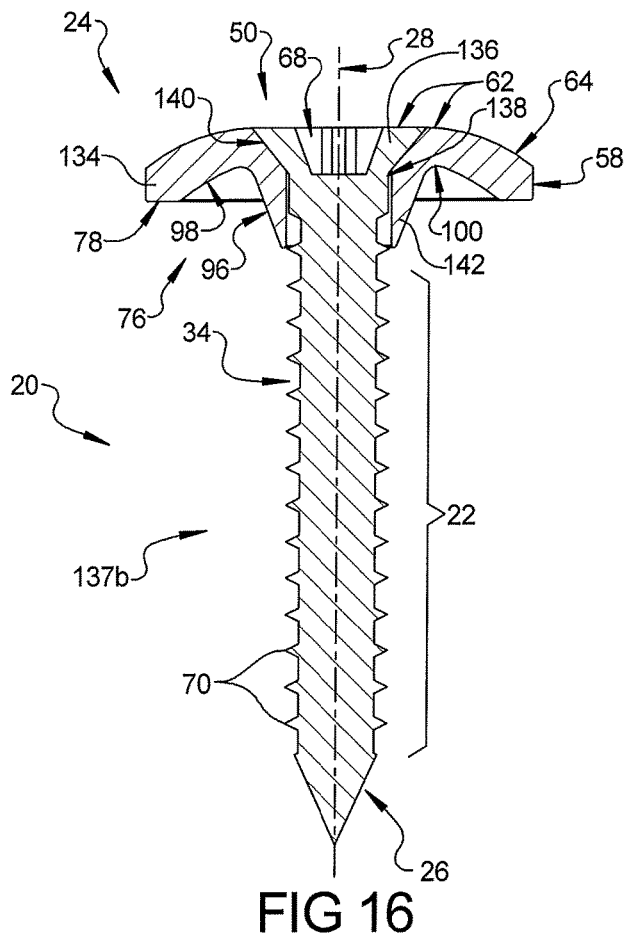
FIG. 16 is a side cross-sectional view of the exemplary compression indentation fastener device illustrated in FIG. 15 taken along line 16-16.
Figure 17:
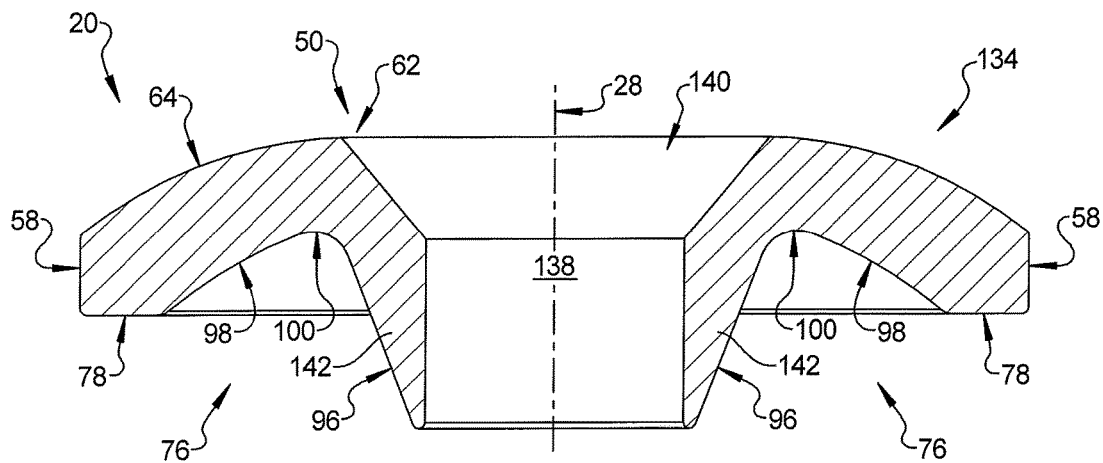
FIG. 17 is a side cross-sectional view of the second head portion of the exemplary compression indentation fastener device illustrated in FIG. 16.

With reference to FIGS. 15-17, an alternative configuration of the screw-like compression indentation fastener device 20 of FIG. 2 is illustrated. Like in the configuration shown in FIGS. 11-14, the head 24 is split into two component parts, the first head portion 134 and the second head portion 136. The first and second head portions 134, 136 are discrete components and together cooperate to form the head 24 of the compression indentation fastener device 20. The first head portion 134 includes the relief portion 76 and the bearing surface 78 and the second head portion 136 includes the tool receiving recess 68 and is integral with the shank 22 and the tip 26. The second head portion 136, the shank 22, and the tip 26 rotate together when rotatably driven by the tool, while the first head portion 134 may remain stationary. Optionally, the second head portion 136, the shank 22, and the tip 26 may be in the form of a conventional screw-like fastener 137b. As such, this configuration allows for the creation of the compression indentation fastener device 20 described herein by fitting the first head portion 134 on a conventional screw-like fastener 137b. The construction of the compression indentation fastener device 20 shown in FIGS. 15-17 is largely the same as the compression indentation fastener device 20 shown in FIGS. 11-14. However, in FIGS. 15-17, the retention feature 70 is provided in the form of the threads illustrated in FIG. 2. Also, the profile of the counter-bore 140 in FIGS. 15-17 differs slightly from that shown in FIGS. 11-14, since the size and shape of counter bore 140 is configured to match the size and shape of the second head portion 136. In FIGS. 11-14, the second head portion 136, as illustrated is substantially planar such that the counter-bore 140 has a rectangular profile. By contrast, the second head portion 136 in FIGS. 15-17 is illustrated as having a frustoconical shape such that the counter-bore 140 has a tapered profile. Notwithstanding, the shapes of the second head portion 136 shown in FIGS. 11-14 and FIGS. 15-17 may be reversed or may have a different shape apart from those shown in the examples set forth herein.

Referring now to FIGS. 18 and 19, an alternative configuration is illustrated where the compression indentation fastener device 20 is in the form of a bolt-like compression indentation fastener device 20. In accordance with this configuration, the compression indentation fastener device 20 may or may not be provided with a tip 26. Like in the configurations shown in FIGS. 11-14 and 15-17, the head 24 is split into two component parts, the first head portion 134 and the second head portion 136. The first and second head portions 134, 136 are discrete components and together cooperate to form the head 24 of the compression indentation fastener device 20. The second head portion 136 has a perimeter 143, which includes at least one planar tool contact surface 144. The at least one planar tool contact surface 144 has a size and shape that is configured to mate with the tool. By way of example and without limitation, the tool may be a wrench or a socket and the perimeter 143 of the first head portion 134 may include a total of six planar tool contact surfaces 144, as illustrate in FIG. 19. Of course, any number of planar tool contact surfaces 144 may be provided. The second head portion 136 is integral with the shank 22 and the first head portion 134 includes the relief portion 76 and the bearing surface 78 and defines the head periphery 58. The second head portion 136 and the shank 22 rotate together when rotatably driven by the tool, while the second head portion 136 may remain stationary. Optionally, the second head portion 136 and the shank 22 may be in the form of a conventional bolt-like fastener 137c. As such, this configuration allows for the creation of the compression indentation fastener device 20 described herein by fitting the first head portion 134 on a conventional bolt-like fastener 137c. The construction of the compression indentation fastener device 20 shown in FIGS. 18 and 19 is largely the same as the compression indentation fastener device 20 shown in FIGS. 11-14 and 15-17. However, the shank 22 is constructed to have a shank length 146 that is greater than a thickness 148 of the substrate material 66 such that the first end 30 of the shank 22 protrudes from the hole 118 in the substrate material 66. The compression indentation fastener device 20 further includes a nut 150 that threadably engages the first end 30 of the shank 22. The nut 150 may also include one or more planar tool contact surfaces 144. The shank length 146 is measurable along the shank axis 28, between the first and second ends 30, 32 of the shank 22. The substrate material 66 further includes a second surface 152 opposite the first surface 74 and the thickness 148 of the substrate material 66 is measurable in a direction that is substantially parallel to the shank axis 28, between the first and second surfaces 74, 152 of the substrate material 66. It should also be appreciated that the substrate material 66 may be comprised of multiple, stacked boards or sheets, including by non-limiting example, lumber, siding, plywood, fiberboard, and oriented strand board. As FIG. 18 illustrates, the first head portion 134 may first be placed along the first surface 74 and driven into the substrate material 66, in singularity. As the first head portion 134 enters the substrate material 66, the frustoconical structure 142 adjacent the through hole 138 may pierce the surface fibers of the substrate material 66 and a plug P of the substrate material 66 may enter the through hole 138. A hole 118 may then be drilled into the substrate surface prior to positioning the tip 26 and/or the shank 22 in the through hole 138 of the first head portion 134 where the through hole 138 of the first head portion 134 may be used as a drill guide. As FIG. 19 illustrates, the shank 22 may be positioned in the through hole 138 of the first head portion 134 and then the shank 22 can subsequently be extended into the hole 118 in the substrate material 66. Finally, the nut 150 may be threaded on the first end 30 of the shank 22 and the nut 150 can be tightened by relative rotational movement of the nut 150 relative to the shank 22 and thus the second head portion 136.

Referring to FIGS. 20-22, another alternative configuration of the compression indentation fastener device 20 is illustrated where the head 24 is offset relative to the second end 32 of the shank 22. As such, this configuration is particularly well suited to collated power driven delivery systems, including by way of non-limiting example, nail-guns. The head 24 has a midpoint 154 that is centrally located along the head cross-section 56 and relative to the head periphery 58. The midpoint 154 is disposed in the transverse plane 46 and is spaced laterally from the shank axis 28 by an offset distance 156. Therefore, it should be appreciated that the head 24 extends further to one side of the shank 22 at greater offset distances 156. The head 24 includes a proximate end 158 where the second end 32 of the shank 22 meets the head 24 and a distal end 160 opposite the proximate end 158. In accordance with this configuration, the relief portion 76 extends from the second end 32 of the shank 22 to the distal end 160 of the head 24. Meanwhile, the relief portion 76 does not extend between the shank 22 and the proximate end 158 of the head 24. As such, at least a majority of the relief portion 76 is positioned off to one side of the shank 22 and is disposed between the second end 32 of the shank 22 and the distal end 160 of the head 24. Therefore, the relief portion 76 does not extend continuously about the second end 32 of the shank 22 in this configuration. As shown in FIG. 22, the relief portion 76 may have a shape that roughly approximates the geometric shape known as a major sector when the relief portion 76 is viewed from a point adjacent the first end 30 of the shank 22 (i.e. when the compression indentation fastener device 20 is viewed with the tip 26 facing the observer).

In addition, the head 24 of the compression indentation fastener device 20 may be elongated in the transverse plane 46. Still referring to FIGS. 20-22, the head 24 defines a lateral axis 162 extending in the transverse plane 46 between the proximate and distal ends 158, 160 of the head 24. The midpoint 154 of the head 24 is disposed along the lateral axis

162. The head 24 has a head length 164 measured parallel to the lateral axis 162 and the head width 60 is measured perpendicular to the lateral axis 162. The head 24 is elongated along the lateral axis 162 such that the head length 164 is greater than the head width 60. As best seen in FIG. 20, the inner surface area 62 of the head 24 may be offset relative to the outer surface area 64 of the head 24 where the inner surface area 62 is shifted closer to the proximate side of the head 24 and is therefore closer to the second end 32 of the shank 22. Apart from the above noted distinctions, the construction of the compression indentation fastener device 20 shown in FIGS. 20-22 is largely the same as the compression indentation fastener device 20 shown in FIGS. 1-8.

FIG. 23 is a plot comparing the ultimate yield pull-through resistance of the compression indentation fastener device 20 illustrated in FIGS. 1 and 3-8 to the ultimate yield pull-through resistance of conventional small-head fasteners and enlarged head fasteners. The data illustrated was compiled from third-party independent testing performed by NTA, Inc. In FIG. 23, the ultimate yield pull-through resistance of a small-head fastener is illustrated by bar 200, the ultimate yield pull-through resistance of an enlarged head fastener is illustrated by bar 202, and the ultimate yield pull-through resistance of a compression indentation fastener device 20 constructed in accordance with the subject disclosure is illustrated by bar 204. Each fastener was tested in three different thicknesses 148 of plywood substrate material 66, including $^{15}/_{32}$ of an inch, $^{19}/_{32}$ of an inch, and $^{23}/_{32}$ of an inch. The plot shows that the ultimate yield pull-through resistance of the enlarged head fastener was higher than the ultimate yield pull-through resistance of the small-head fastener for each thickness 148 of substrate material 66 tested. The plot also shows that the ultimate yield pull-through resistance of the compression indentation fastener device 20 described herein was higher than that of both the small-head fastener and the enlarged head fastener for each thickness 148 of substrate material 66 tested. These test results confirm and quantify the improved ultimate yield pull-through resistance of the compression indentation fastener device 20 described herein.

As one would expect, the pull-through resistance of each fastener increased as the thickness 148 of the substrate material 66 was increased. However, somewhat unexpectedly, the pull-through resistance of the small-head fastener and the enlarged head fastener did not increase proportionally with the increase in thickness 148 of the substrate material 66, but increased at a lesser rate. This is likely due to the fact that the planar geometry of the small-head fastener and the enlarged head fastener cuts and/or ruptures the surface fibers of the substrate material 66 once a certain amount of force is applied to the fastener.

In FIG. 23, a first line 206 depicting the increasing thickness 148 of the substrate material 66 is illustrated for reference purposes. A second line 208 depicts the increasing values of ultimate yield pull-through resistance of the small-head fastener and a third line 210 depicts the increasing values of ultimate yield pull-through resistance of the enlarged head fasteners. Finally, the ultimate yield pull-through resistance of the compression indentation fastener device 20 described herein is depicted by a fourth line 212. The second and third lines 208, 210, which correspond to the pull-through performance of the small-head and enlarged head fasteners, have slopes that are substantially the same and less than a slope of the first line 206. In other words, the second and third lines 208, 210 are substantially parallel to one another and the second and third lines 208, 210 are less steep than the first line 206, which corresponds to the thickness 148 increase in the substrate material 66. This means that even though the values for ultimate yield pull-through resistance of the enlarged head fastener was greater than the values for ultimate yield pull-through resistance of the small-head fastener, both of the small-head and enlarged head fasteners performed similarly to one another in response to increasing the thickness 148 of the substrate material 66. This also means that the increase in the thickness 148 of the substrate material 66 outpaced the values for ultimate yield pull-through resistance of the small-head and enlarged head fasteners. In other words, if the thickness 148 of the substrate material 66 is doubled, the ultimate yield pull-through resistance of the small-head and enlarged head fasteners would not double, but would increase to a lesser extent.

By contrast, the fourth line 212, which corresponds to the pull-through performance of the compression indentation fastener device 20 described herein, has a slope that is greater than the slope of the first line 206. This means that the values for ultimate yield pull-through resistance of the disclosed compression indentation fastener device 20 outpaced the increase in the thickness 148 of the substrate material 66. In other words, if the thickness 148 of the substrate material 66 is doubled, the ultimate yield pull-through resistance of the disclosed compression indentation fastener device 20 would more than double.

An additional performance advantage is illustrated with reference to horizontal datum line 214, which corresponds to the lowest ultimate yield pull-through resistance value of the disclosed compression indentation fastener device 20 (i.e. the value for the $^{15}/_{32}$ of an inch thickness 148). The highest ultimate yield pull-through resistance value achieved by the enlarged head fastener is less than the horizontal datum line 214, and thus the lowest ultimate yield pull-through resistance value of the disclosed compression indentation fastener device 20, by an offset value S. In similar fashion, the highest ultimate yield pull-through value achieved by the small-head fastener is less than the horizontal datum line 214, and thus the lowest ultimate yield pull-through resistance value of the disclosed compression indentation fastener device 20, by value T. The benefits of the compression indentation fastener device 20 described herein are therefore evident in the plot shown in FIG. 23 because a higher ultimate yield pull-through resistance value can be achieved with the disclosed compression indentation fastener device 20 in the thinner $^{15}/_{32}$ of an inch thick substrate material 66 than can be achieved with either of the small-head fastener or the enlarged head fastener in the thicker $^{23}/_{32}$ of an inch thick substrate material 66. Therefore, cost savings can be realized by using a thinner, more cost effective substrate material 66 while still realizing improved pull-through resistance. Accordingly, the compression indentation fastener device 20 described above can significantly improve the structural integrity of various structures, including without limitation, wood frame buildings.

Figure 24:
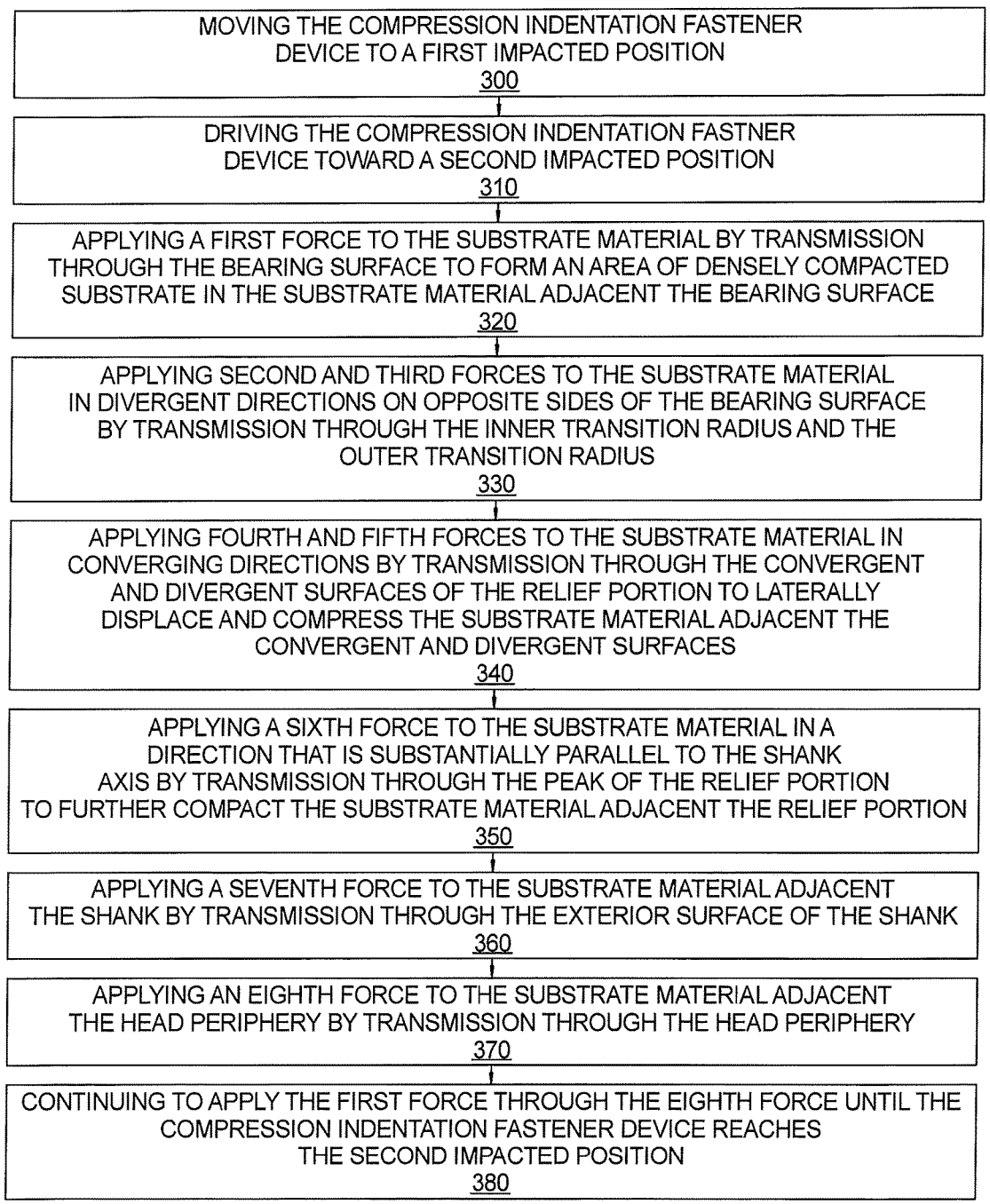
FIG. 24 is a flowchart illustrating an exemplary method of using an exemplary compression indentation fastener device constructed in accordance with the subject disclosure.

Now referring to FIG. 24, a method of using the compression indentation fastener device 20 described above is illustrated. The method includes the step illustrated by block 300, which provides for moving the compression indentation fastener device 20 to a first impacted position, where the reference plane 80 of the bearing surface 78 is aligned with the first surface 74 of the substrate material 66 such that the bearing surface 78 sits flush in contact with the first surface 74 of the substrate material 66. The step illustrated by block 300 may include moving the shank 22 of the compression indentation fastener device 20 into the substrate material 66. The method includes the step illustrated by block 310, which provides for driving the compression indentation fastener device 20 toward a second impacted position, where the inner surface area 62 of the posterior side 50 of the head 24 is aligned with the first surface 74 of the substrate material 66 such that the inner surface area 62 of the posterior side 50 of the head 24 is flush with the first surface 74 of the substrate The method includes the step illustrated by block 320, which provides for applying a first force F1 to the substrate material 66 by transmission through the bearing surface 78 to form an area of densely compacted substrate D in the substrate material 66 adjacent the bearing surface 78. The step illustrated by block 320 may include applying the first force F1 to the substrate material 66 in a direction that is substantially parallel to the shank axis 28. The method includes the step illustrated by block 330, which provides for applying second and third forces F2, F3 to the substrate material 66 in divergent directions on opposite sides of the bearing surface 78 by transmission through the inner transition radius 84 and the outer transition radius 82. The method includes the step illustrated by block 340, which provides for applying fourth and fifth forces F4, F5 to the substrate material 66 in converging directions by transmission through the convergent and divergent surfaces 96, 98 of the relief portion 76 to laterally displace and compress the substrate material 66 adjacent the convergent and divergent surfaces 96, 98. The step illustrated by block 340 may include applying the fourth and fifth forces F4, F5 in converging directions that are oblique to the shank axis 28. The method further includes the step illustrated by block 350, which provides for applying a sixth force F6 to the substrate material 66 in a direction that is substantially parallel to the shank axis 28 by transmission through the peak 100 of the relief portion 76 to further compact the substrate material 66 adjacent the relief portion 76.

Additionally, the method includes the step illustrated by block 360, which provides for applying a seventh force F7 to the substrate material 66 adjacent the shank 22 by transmission through the exterior surface 34 of the shank 22 and the step illustrated by block 370, which provides for applying an eighth force F8 to the substrate material 66 adjacent the head periphery 58 by transmission through the head periphery 58. In the steps illustrated by block 360 and block 370, the seventh and eighth forces F7, F8 may be applied in a direction that is substantially perpendicular to the shank axis 28, meaning that the seventh and eighth forces F7, F8 are directed outwardly on the substrate material 66 relative to the shank axis 28. The method may also include the step illustrated by block 380, which provides for continuing to apply the first force F1 through the eighth force F8 until the compression indentation fastener device 20 reaches the second impacted position.

It should be appreciated that although steps 300-380 of the method are described and illustrated herein in a particular order, steps 300-380 may be performed in a different order without departing from the scope of the present disclosure, except where the order of the steps is otherwise noted.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A compression indentation fastener device having a nail-like arrangement comprising:

a shank extending along a shank axis and between a first end and a second end, said shank having a shank diameter and an exterior surface that is smooth and has a cylindrical shape;

a head disposed at said second end of said shank, said head extending outwardly from said second end of said shank in a transverse plane that is substantially perpendicular to said shank axis to define a head periphery;

said head having an anterior side adjacent said second end of said shank and a posterior side opposite said anterior side, said anterior side of said head including an exposed area arranged to impact a first surface of a substrate material, said exposed area extending between said second end of said shank and said head periphery;

said anterior side of said head including a relief portion disposed between said shank and said head periphery, said relief portion spaced radially inward of said head periphery to define a bearing surface that is disposed radially between said relief portion and said head periphery, wherein said relief portion is a depression that extends continuously about said second end of said shank and that is open at said anterior side of said head to receive and compress a volume of the substrate material when said exposed area of said anterior side of said head impacts the first surface of the substrate material, creating an area of densely compacted substrate at a location adjacent said bearing surface; and said head including a convergent surface extending radially outwardly from said second end of said shank to a peak of said relief portion on said anterior side of said head at a progressively increasing diameter such that said head has a diameter that is greater than said shank diameter at all points along said convergent surface and a divergent surface extending outwardly from said peak to said bearing surface, wherein said convergent surface is smooth and has a frustoconical shape, wherein said bearing surface has a planar, ring-like shape that defines a reference plane that is substantially parallel to said transverse plane and that is substantially perpendicular to said shank axis, said posterior side of said head being located to one side of said reference plane and said first end of said shank being located to an opposite side of said reference plane, wherein said head is made of a rigid material that has a hardness of at least 3.5 on Mohs hardness scale.

2. The compression indentation fastener device set forth in claim 1 wherein said head is moveable between a first impacted position and a second impacted position, said reference plane of said bearing surface is adapted to be aligned with the first surface of the substrate material in said first impacted position, and at least a portion of said head is adapted to be embedded in the substrate material in said second impacted position.

3. The compression indentation fastener device set forth in claim 2 wherein said rigid material of said head resists deformation when said head moves from said first impacted position to said second impacted position, said rigid material of said head is adapted to be harder than the substrate material.

4. The compression indentation fastener device set forth in claim 2 wherein said bearing surface is adapted to apply a first force to the substrate material as said head moves from said first impacted position to said second impacted position to form an area of densely compacted substrate in the substrate material adjacent said bearing surface and wherein said convergent and divergent surfaces of said relief portion are adapted to apply a second force and a third force to the substrate material as said head moves from said first impacted position to said second impacted position to laterally displace and compress the substrate material adjacent said convergent and divergent surfaces and form the volume of substrate material that is received by said relief portion.

5. The compression indentation fastener device set forth in claim 2 wherein said bearing surface extends between an outer transition radius and an inner transition radius, said outer transition radius disposed between said bearing surface and said head periphery, said inner transition radius disposed between said bearing surface and said divergent surface of said relief portion, said outer transition radius and said inner transition radius providing round, gradual transitions between said head periphery, said bearing surface, and said relief portion that are adapted to prevent surface fibers at the first surface of the substrate material from becoming cut as said head moves from said first impacted position to said second impacted position.

6. The compression indentation fastener device set forth in claim 1 wherein said divergent surface defines a divergent surface reference line that intersects said shank axis at a first acute angle and at a first location disposed on said side of said reference plane where said posterior side of said head is located.

7. The compression indentation fastener device set forth in claim 6 wherein said convergent surface defines a convergent surface reference line that intersects said shank axis at a second acute angle and at a second location disposed on said opposite side of said reference plane where said first end of said shank is located, said first acute angle being greater than said second acute angle.

8. The compression indentation fastener device set forth in claim 1 wherein said convergent and divergent surfaces join one another at said peak of said relief portion, said peak disposed between said reference plane and said posterior surface of said head.

9. The compression indentation fastener device set forth in claim 1 wherein said shank and said head are integral as part of a one-piece structure.

10. The compression indentation fastener device set forth in claim 1 wherein said convergent surface extends between a first terminus and a second terminus, said first terminus disposed along said shank between said reference plane and said first end of said shank, and said second terminus disposed at the peak of the relief portion between said posterior side of said head and said reference plane.

11. A compression indentation fastener device having a nail-like arrangement comprising:
a shank extending along a shank axis and between a first end and a second end;
a tip that smoothly tapers to a point at said first end of said shank;
a head disposed at said second end of said shank, said head extending outwardly from said second end of said shank in a transverse plane that is substantially perpendicular to said shank axis to define a head periphery;
said shank having a shank diameter and an exterior surface consisting of a smooth cylindrical shape that runs the entire length of said shank from said head to said tip;
said head having an anterior side adjacent said second end of said shank and a posterior side opposite said anterior side, said anterior side of said head including an exposed area arranged to impact a first surface of a substrate material, said exposed area extending between said second end of said shank and said head periphery;
said anterior side of said head including a relief portion disposed between said shank and said head periphery, said relief portion spaced radially inward of said head periphery to define a bearing surface that is disposed radially between said relief portion and said head periphery, wherein said relief portion is a depression that extends continuously about said second end of said shank and that is open at said anterior side of said head to receive and compress a volume of the substrate material when said exposed area of said anterior side of said head impacts the first surface of the substrate material, creating an area of densely compacted substrate at a location adjacent said bearing surface; and
said head including a convergent surface extending radially outwardly from said second end of said shank to a peak of said relief portion on said anterior side of said head at a progressively increasing diameter such that said head has a diameter that is greater than said shank diameter at all points along said convergent surface and a divergent surface extending outwardly from said peak to said bearing surface, wherein said convergent surface is smooth and has a frustoconical shape,
wherein said head is made of a rigid material that has a hardness of at least 3.5 on Mohs hardness scale.

12. The compression indentation fastener device set forth in claim 11 wherein said exterior surface of said shank is threadless.

13. A compression indentation fastener device having a nail-like arrangement comprising:
a shank extending along a shank axis and between a first end and a second end, said shank having a shank diameter and an exterior surface that is smooth and has a cylindrical shape;
a head disposed at said second end of said shank, said head extending outwardly from said second end of said shank in a transverse plane that is substantially perpendicular to said shank axis to define a head periphery;
said head having an anterior side adjacent said second end of said shank and a posterior side opposite said anterior side, said anterior side of said head including an exposed area arranged to impact a first surface of a substrate material, said exposed area extending between said second end of said shank and said head periphery;
said anterior side of said head including a relief portion disposed between said shank and said head periphery, said relief portion spaced radially inward of said head periphery to define a bearing surface that is disposed radially between said relief portion and said head periphery, wherein said relief portion is a depression that extends continuously about said second end of said shank and that is open at said anterior side of said head to receive and compress a volume of the substrate material when said exposed area of said anterior side of said head impacts the first surface of the substrate material, creating an area of densely compacted substrate at a location adjacent said bearing surface; and said head including a convergent surface extending radially outwardly from said second end of said shank to a peak of said relief portion on said anterior side of said head at a progressively increasing diameter such that said head has a diameter that is greater than said shank diameter at all points along said convergent surface and a divergent surface extending outwardly from said peak to said bearing surface, wherein said convergent surface is smooth and has a frustoconical shape, wherein said bearing surface has a planar, ring-like shape that defines a reference plane that is substantially parallel to said transverse plane and that is substantially perpendicular to said shank axis, said posterior side of said head being located to one side of said reference plane and said first end of said shank being located to an opposite side of said reference plane, wherein said head is moveable between a first impacted position and a second impacted position, said reference plane of said bearing surface is adapted to be aligned with the first surface of the substrate material in said first impacted position, and at least a portion of said head is adapted to be embedded in the substrate material in said second impacted position, wherein said head is made of a rigid material that resists deformation when said head moves from said first impacted position to said second impacted position, said rigid material of said head is adapted to be harder than the substrate material, wherein said rigid material of said head has a hardness of at least 3.5 on Mohs hardness scale.

* * * * *